US012640611B2

(12) United States Patent
Hori et al.

(10) Patent No.: US 12,640,611 B2
(45) Date of Patent: May 26, 2026

(54) MOTOR WITH NEUTRAL MOVEMENT RESTRICTION PART

(71) Applicant: AICHI ELECTRIC CO., LTD., Kasugai (JP)

(72) Inventors: Takashi Hori, Kasugai (JP); Shoji Mano, Kasugai (JP); Masahiro Hasegawa, Kasugai (JP)

(73) Assignee: AICHI ELECTRIC CO., LTD., Kasugai (JP)

( * ) Notice: Subject to any disclaimer, the term of this patent is extended or adjusted under 35 U.S.C. 154(b) by 215 days.

(21) Appl. No.: 18/606,098

(22) Filed: Mar. 15, 2024

(65) Prior Publication Data

US 2024/0333069 A1 Oct. 3, 2024

(30) Foreign Application Priority Data

Mar. 29, 2023 (JP) ................................. 2023-053999

(51) Int. Cl.
*H02K 3/52* (2006.01)
*F25B 31/02* (2006.01)
(Continued)

(52) U.S. Cl.
CPC ............. *H02K 3/522* (2013.01); *H02K 1/146* (2013.01); *H02K 21/16* (2013.01); *F25B 31/026* (2013.01); *H02K 2203/12* (2013.01)

(58) Field of Classification Search
CPC ........ H02K 3/522; H02K 1/146; H02K 21/16; H02K 2203/12; H02K 2203/09; H02K 3/345; H02K 3/50; F25B 31/026
(Continued)

(56) References Cited

U.S. PATENT DOCUMENTS 6,992,417 B1 1/2006 Yamada
7,557,478 B2 * 7/2009 Hoshika ................. H02K 3/522
310/71
(Continued)

FOREIGN PATENT DOCUMENTS

JP 2004215325 A 7/2004
JP 2021083218 A 5/2021
WO 2017138534 A1 8/2017

OTHER PUBLICATIONS

Unpublished U.S. Appl. No. 18/606,082, first named inventor: Takashi HORI, filed Mar. 15, 2024.
(Continued)

*Primary Examiner* — Ahmed Elnakib
(74) *Attorney, Agent, or Firm* — J-TEK LAW PLLC; Jeffrey D. Tekanic; Scott T. Wakeman

(57) ABSTRACT

A motor includes a rotor and a stator having a tubular stator core, first and second electrical insulators arranged on first and second axial ends of the stator care and a stator winding. Each of the first and second electrical insulators includes an outer wall part, inner wall parts and body parts. The stator winding includes first, second and third phase stator windings and each of the windings has winding parts respectively wound around teeth of the stator core, a first lead part and a second lead part. Each of the first lead parts is connected to a power supply, and each of the second lead parts is connected in common to a neutral point part. The outer wall part of the first electrical insulator assembly includes a first movement restriction part that restricts movement of the neutral point part.

20 Claims, 19 Drawing Sheets

(51) Int. Cl.
  *H02K 1/14*     (2006.01)
  *H02K 21/16*    (2006.01)

(58) Field of Classification Search
  USPC ............................................ 310/216.105, 71
  See application file for complete search history.

(56) References Cited

U.S. PATENT DOCUMENTS

| | | |
|---|---|---|
| 8,450,898 B2 | 5/2013 | Sears et al. |
| 8,917,006 B2 | 12/2014 | Jang et al. |
| 10,374,479 B2 | 8/2019 | Lee et al. |
| 11,536,492 B2 | 12/2022 | Kim et al. |
| 11,652,375 B2 | 5/2023 | Shin et al. |
| 11,713,754 B2 | 8/2023 | Guntermann et al. |
| 12,136,860 B2 | 11/2024 | Naderer et al. |
| 12,149,139 B2 | 11/2024 | Araki et al. |
| 2004/0245882 A1 | 12/2004 | Horie et al. |
| 2004/0252001 A1 | 12/2004 | Yamada et al. |
| 2006/0012261 A1 | 1/2006 | Ku et al. |
| 2009/0324435 A1 | 12/2009 | Sears et al. |
| 2011/0109189 A1 | 5/2011 | Taema |
| 2012/0080976 A1 | 4/2012 | Oka et al. |
| 2012/0086299 A1 | 4/2012 | Hsu et al. |
| 2012/0175992 A1 | 7/2012 | Jang et al. |
| 2012/0286593 A1* | 11/2012 | Yokogawa ............. H02K 3/522 |
| | | 310/43 |
| 2015/0008769 A1 | 1/2015 | Uchitani et al. |
| 2015/0008775 A1* | 1/2015 | Arai ......................... H02K 3/28 |
| | | 310/71 |
| 2015/0035404 A1 | 2/2015 | Taema |
| 2018/0351428 A1 | 12/2018 | Okamoto et al. |
| 2021/0351637 A1 | 11/2021 | Chung et al. |
| 2023/0208237 A1* | 6/2023 | Gopalakrishnan ....... H02K 3/50 |
| | | 310/71 |
| 2024/0333062 A1 | 10/2024 | Hori et al. |
| 2024/0333069 A1* | 10/2024 | Hori ...................... H02K 21/16 |

OTHER PUBLICATIONS

Notice of Allowance from the USPTO mailed Dec. 23, 2025, in related U.S. Appl. No. 18/606,082, and allowed claims 1-13.

* cited by examiner

MOTOR WITH NEUTRAL MOVEMENT RESTRICTION PART

CROSS-REFERENCE

The present application claims priority to Japanese patent application serial number JP 2023-053999 filed on Mar. 29, 2023, the contents of which are incorporated fully herein by reference.

TECHNICAL FIELD

The present disclosure relates to a motor that includes a first lead part connected to a power supply and a second lead part connected to a common point.

BACKGROUND

In various devices such as compressors or the like, a motor including star-connected U-phase, V-phase and W-phase stator windings (coils) is used. For example, WO 2017-138534 A1 (a family member of U.S. Pat. No. 10,680, 482 B2) discloses a compressor with a motor including star-connected phase stator windings. The compressor disclosed in WO2017-138534 includes a housing, and a compression mechanism part and a motor that are housed in the housing. The motor includes a stator and a rotor. The stator includes a stator core, electrical insulator assemblies (referred to as "resin bobbins", "polymer bobbins", "bobbins" or "insulators") that are respectively arranged on first and second sides of the stator core in an axial direction, and a stator winding. The stator winding includes U-phase, V-phase and W-phase stator windings. Each of the phase stator windings has winding parts, a first lead part and a second lead part. The winding parts are respectively wound around the teeth of the stator core in a state in which the electrical insulator assemblies are arranged on both sides of the stator core in the axial direction. The first lead parts are connected to a power supply, and the second lead parts are connected to a common point. Thus, the phase stator windings are star-connected.

In such a motor, the second lead parts connected in common could move and come into contact with nearby electrical components. Therefore, in the motor disclosed in WO 2017-138534 A1, in order to restrict movement of the second lead parts, a guide member that is configured to hold the second lead parts is provided on the opposite side of one of the electrical insulator assemblies to the stator core.

SUMMARY

The motor disclosed in WO 2017-138534 A1 needs the guide member that holds the second lead parts. Further, it is necessary to mount the guide member to (on) the electrical insulator assembly and to wire the second lead parts to the guide member that is formed separately from the electrical insulator assembly.

Accordingly, it is one non-limiting object of the present disclosure to disclose techniques for easily restricting (preventing, blocking, restraining, limiting) movement of the lead parts connected in common using a simple structure.

The present disclosure relates to a motor that comprises a rotor and a stator.

The stator includes a tubular stator core extending in an axial direction, first and second electrical insulator assemblies that are respectively arranged (disposed) on first and second sides of the stator core in the axial direction, and a stator winding.

The stator core includes a yoke extending in a circumferential direction around an axis of the stator core, and teeth each extending radially inward from the yoke.

Each of the first and second electrical insulator assemblies includes an outer wall part, inner wall parts and body parts. The outer wall part extends in the circumferential direction and the axial direction. The inner wall parts are arranged radially inward of the outer wall part and are placed at positions spaced apart from each other in the circumferential direction and extend in the circumferential direction and the axial direction. The body parts are arranged on the stator core side in the axial direction between the outer wall part and the inner wall parts and extend radially.

The stator winding includes first, second and third phase stator windings. Each of the phase stator windings includes at least one winding part (winding, coil), a first lead part and a second lead part. Each winding part is formed by a lead wire wound around a respective one of the teeth of the stator core in a state in which the first and second electrical insulator assemblies are respectively arranged (disposed) on the first and second sides of the stator core in the axial direction. The first lead parts are connected to a power supply, and the second lead parts are connected to a common point. Thus, the phase stator windings are star-connected.

The stator winding includes a neutral point part (common point) to which the second lead parts of the phase stator windings are connected in common.

Furthermore, the outer wall part of the first electrical insulator assembly includes at least one movement restriction part that restricts (prevents, limits, blocks, retrains) movement of the neutral point part.

In the motor of this disclosure, the at least one movement restriction part that restricts movement of the second lead parts is provided on the outer wall part of the first electrical insulator assembly. Thus, movement of the second lead parts can be easily restricted (prevented, limited, blocked, retrained) using a simple structure.

In another aspect of the motor according to this disclosure, the at least one movement restriction part may comprise at least one first movement restriction part. The at least one first movement restriction part may be configured to restrict the neutral point part from moving radially inward and radially outward and toward the second side (stator core side) in the axial direction. When two or more first projections are provided, the projections are placed at positions spaced apart from each other in the circumferential direction.

In this aspect, the second lead parts can be restricted from moving radially inward and radially outward and toward the second side in the axial direction using a simple structure.

In another aspect of the motor according to this disclosure, the outer wall part of the first electrical insulator assembly may include at least one first projection protruding toward the first side (the opposite side to the stator core) in the axial direction.

Furthermore, at least one first projection may have a groove that extends in the circumferential direction and is open on the first side (the opposite side to the stator core) in the axial direction. The groove may be configured such that the neutral point part can be inserted therein.

The at least one first movement restriction part may include the groove formed (defined, provided) on the at least one first projection.

In this aspect, the second lead parts can be restricted from moving radially inward and radially outward and toward the second side in the axial direction using a simple structure.

In another aspect of the motor according to this disclosure, the first movement restriction part may be configured to restrict (prevents, limits, blocks, retrains) movement of the neutral point part toward at least one of the first and second sides in the circumferential direction.

In this aspect, the second lead parts are restricted (prevented, limited, blocked, retrained) from moving radially inward and radially outward and toward the second side in the axial direction and toward at least one of the first and second sides in the circumferential direction.

In another aspect of the motor according to this disclosure, the groove formed (defined, provided) on the at least one first projection may be closed on at least one of the first and second sides in the circumferential direction.

In this aspect, the second lead parts can be restricted from moving radially inward and radially outward and toward the second side in the axial direction and toward at least one of the first and second sides in the circumferential direction using a simple structure.

In another aspect of the motor according to this disclosure, the groove formed on the at least one first projection may be open on at least one of the first and second sides in the circumferential direction.

In this aspect, the neutral point part can be easily inserted into the groove.

In another aspect of the motor according to this disclosure, the at least one movement restriction part may comprise at least one second movement restriction part. The at least one second movement restriction part may be configured to restrict circumferential movement of the neutral point part in at least one direction.

In this aspect, the second lead parts can be restricted from moving radially inward and radially outward and toward the second side in the axial direction and toward at least one side in the circumferential direction using a simple structure.

In another aspect of the motor according to this disclosure, the outer wall part of the first electrical insulator assembly may include at least one first projection and at least one second projection protruding toward the first side (the opposite side to the stator core) in the axial direction. The at least one first projection may have a groove that extends in the circumferential direction and is open on the first side (the opposite side to the stator core) in the axial direction. The groove may be configured such that the neutral point part can be inserted therein. The at least one second projection may be circumferentially spaced apart from the at least one first projection.

In this aspect, the second lead parts can be restricted from moving radially inward and radially outward and toward the second side in the axial direction and toward at least one side in the circumferential direction using a simple structure.

In another aspect of the motor according to this disclosure, the groove formed on the at least one of the projections may be open on the first and second sides in the circumferential direction.

In this aspect, the neutral point part can be more easily inserted into the groove.

In another aspect of the motor according to this disclosure, the outer wall part of the first electrical insulator assembly may include second movement restriction parts on each of the first and second sides of the at least one of the projections in the circumferential direction.

The second movement restriction part arranged (disposed) on the first side in the circumferential direction may be configured to restrict (prevent, limit, block, retrain) movement of the neutral point part toward the first side in the circumferential direction, and the second movement restriction part arranged (disposed) on the second side in the circumferential direction may be configured to restrict (prevent, limit, block, retrain) movement of the neutral point part toward the second side in the circumferential direction.

In this aspect, movement of the second lead parts toward the first and second sides in the circumferential direction can be easily restricted (prevented, limited, blocked, retrained).

In another aspect of the motor according to this disclosure, the second movement restriction part may include the projections other than the at least one of the projections.

In this aspect, the second movement restriction part can be easily formed.

In another aspect of the motor according to this disclosure, the neutral point part may include a neutral point bus bar to which the second lead parts are connected.

The neutral point bus bar may be formed (composed) of an electrically conductive material, such as a metal.

In this aspect, the neutral point part can be easily formed.

In another aspect of the motor according to this disclosure, the stator may include a cover. The cover may be arranged (disposed) on the first side (the opposite side to the stator core) of the first electrical insulator assembly in the axial direction.

In this aspect, movement of the neutral point part to the first side (the opposite side to the stator core) in the axial direction can be restricted (prevented, limited, blocked, retrained).

Thus, in motors of the present disclosure, movement of the lead parts connected in common can be easily restricted (prevented, limited, blocked, retrained) using a simple structure.

BRIEF DESCRIPTION OF THE DRAWINGS

FIG. 14 is a sectional view of the cover of FIG. 12 in the direction of line XIV-XIV in

FIG. 12.

DETAILED DESCRIPTION OF THE EMBODIMENT

Figure 1:
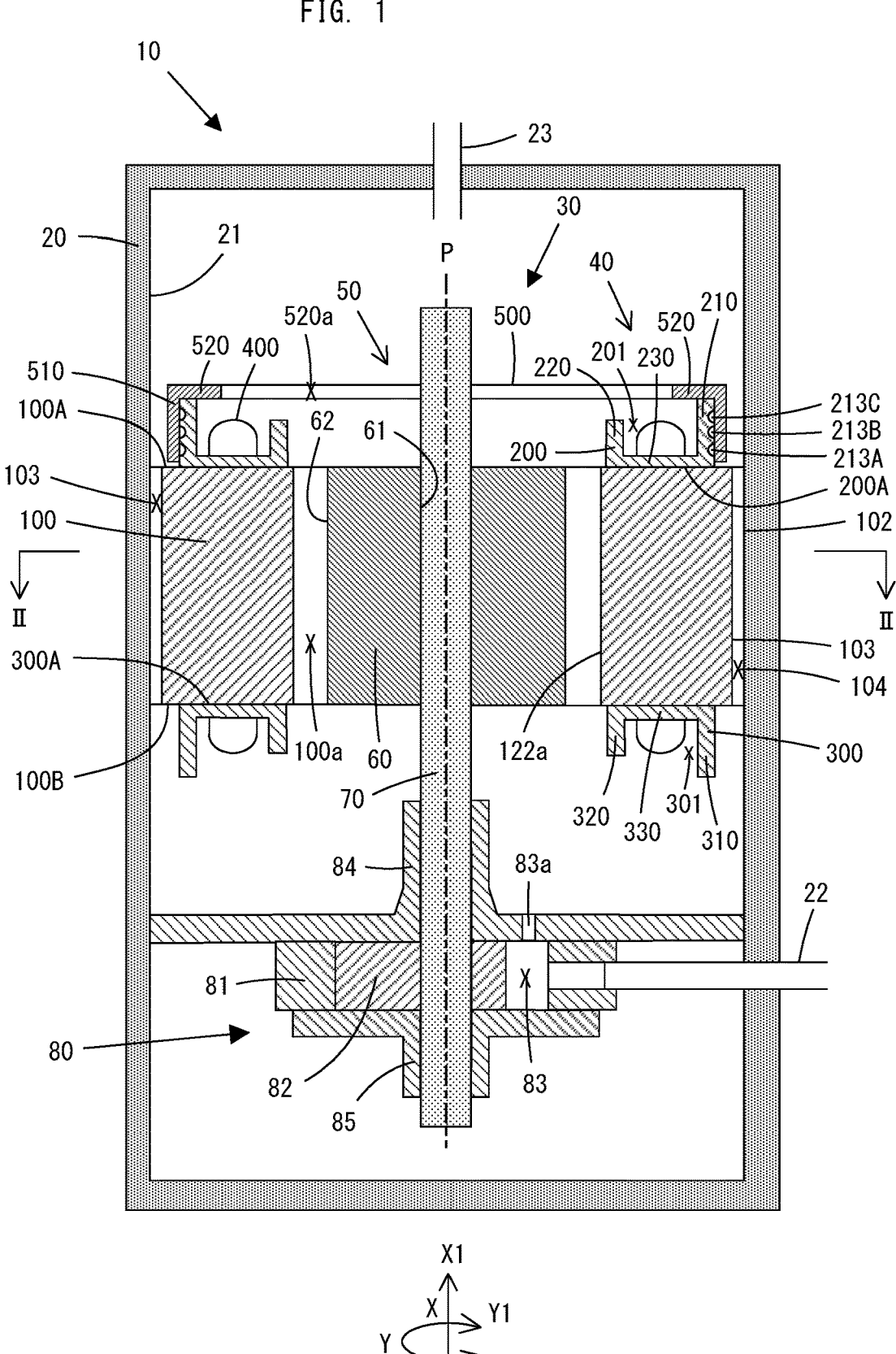
FIG. 1 is a partial, sectional view of a compressor of an embodiment of the present disclosure.

A representative embodiment of a motor according to the present disclosure will be described with reference to the drawings.

In this description, the term "axial direction" refers to an extending direction (shown by X in FIGS. 1 and 2) of an axis P of a stator core 100. The axis P of the stator core 100 corresponds to a rotation center line (rotational axis) of a rotor 50 when the rotor 50 is arranged to be rotatable relative to a stator 40.

The term "circumferential direction" refers to a circumferential direction (shown by Y in FIG. 2) around the axis P as viewed from one side in the axial direction.

The term "radial direction" refers to an extending direction of any line passing through the axis P as viewed from the one side in the axial direction. The term "inner side (inside, inward) in the radial direction" or "radially inner side" refers to the axis P side in the radial direction and the term "outer side (outside, outward) in the radial direction" or "radially outer side" refers to the opposite side to the axis P in the radial direction.

As for electrical insulator assemblies (a first electrical insulator assembly 200, a second electrical insulator assembly 300) and cover 500, the terms "axial direction", "circumferential direction" and "radial direction" respectively refer to the "axial direction", "circumferential direction" and "radial direction" in a state in which the electrical insulator assemblies and the cover 50 are mounted on the stator core 100.

Furthermore, in FIG. 1, the side shown by arrow X1 (upper side in FIG. 1) and the side shown by arrow X2 (lower side in FIG. 1) are defined as a "first side in the axial direction" and a "second side in the axial direction", respectively.

Figure 2:
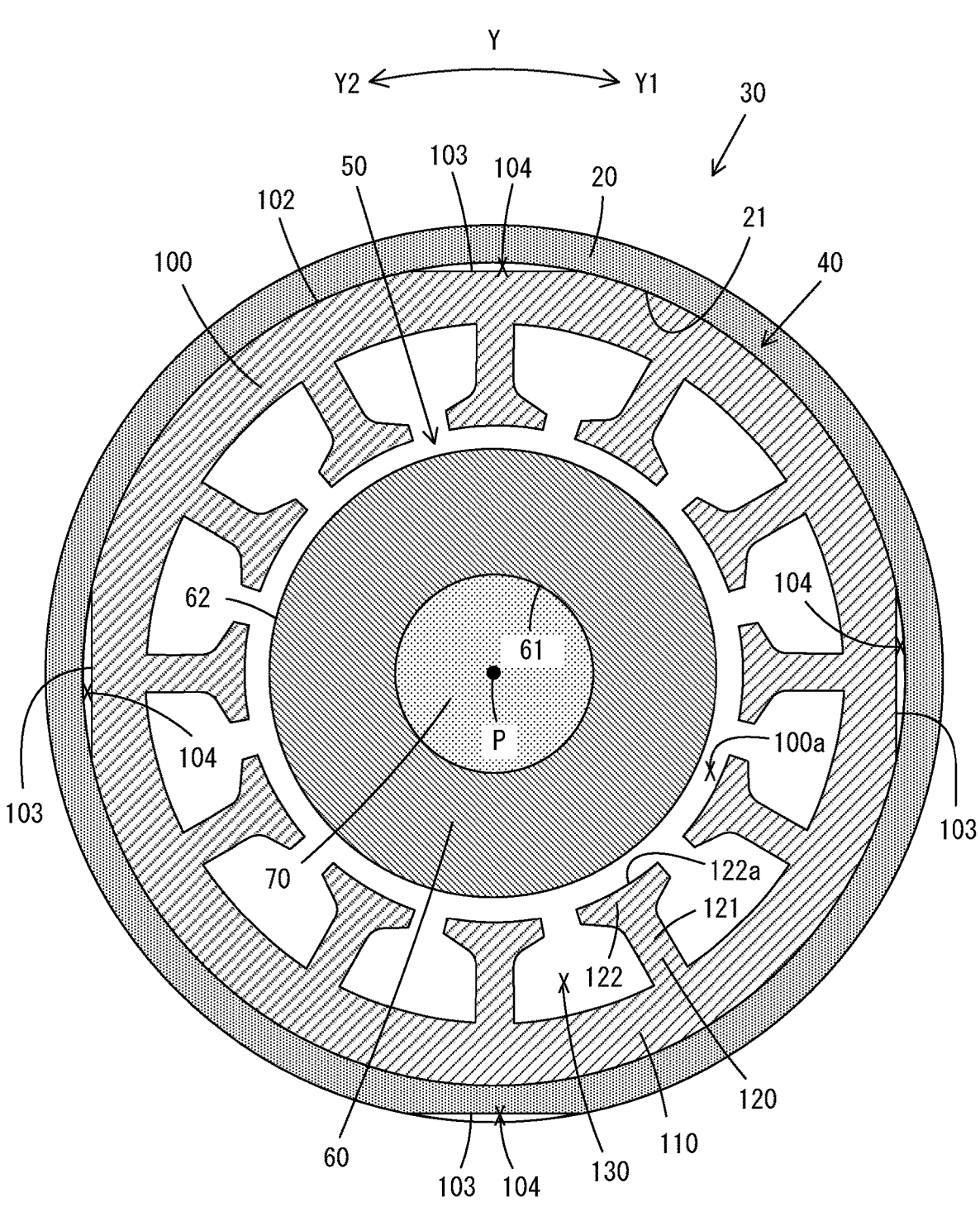
FIG. 2 is a sectional view taken in the direction of line II-II in FIG. 1.

Furthermore, in FIGS. 1 and 2, the side (clockwise side) shown by arrow Y1 and the side (counterclockwise side) shown by arrow Y2 are defined as a "first side in the circumferential direction" and a "second side in the circumferential direction", respectively.

The "first side in the axial direction" and the "second side in the axial direction" may be defined in reverse, and the "first side in the circumferential direction" and the "second side in the circumferential direction" may be defined in reverse.

A compressor 10 of one embodiment of the present teachings and a motor 30 of one embodiment of the present teachings that can be advantageously used in the compressor 10 will be described with reference to FIGS. 1 to 16.

The compressor 10 includes a housing 20, the motor 30 and a compression mechanism part 80. The motor 30 and the compression mechanism part 80 are housed in a housing interior space that is defined by a housing inner peripheral surface 21 of the housing 20. The housing interior space is closed.

The housing 20 is provided with a suction pipe 22 and a discharge pipe 23.

The compression mechanism part 80 compresses a working medium (such as a "refrigerant" or a "coolant") for transferring thermal energy. For example, an HFC (hydrofluorocarbon) refrigerant may be used as the working medium.

The compression mechanism part 80 includes a cylinder 81, an eccentric rotor 82 that is rotated by a rotary shaft 70, and a compression chamber 83. The rotary shaft 70 is rotatably supported by bearings 84, 85. When the eccentric rotor 82 is rotated by rotation of the rotary shaft 70, the working medium drawn through the suction pipe 22 is compressed within the compression chamber 83. Then, the compressed working medium is discharged from the discharge pipe 23 via an outlet port 83*a* and a passage provided in the motor 30.

The arrangement position (the arrangement position in the up-down direction or in the left-right direction) of the compression mechanism part 80 and the motor 30 can be appropriately changed. A known compression mechanism part can be used as the compression mechanism part.

The motor 30 includes a stator 40 and a rotor 50.

The rotor 50 includes a rotor core 60 and a rotatable shaft 70. The rotor core 60 has a tubular shape and has a rotor core inner peripheral surface 61 and a rotor core outer peripheral surface 62. The rotatable shaft 70 is inserted (for example, press-fitted) into a rotatable shaft insertion hole that is defined by the rotor core inner peripheral surface 61.

The stator 40 includes a stator core 100, the first electrical insulator assembly 200, the second electrical insulator assembly 300, a stator winding 400, a neutral point bus bar 410 and a cover 500, as will be described in further detail below.

The stator core 100 is formed (composed) of a stack of laminated electromagnetic steel sheets.

The stator core 100 has a tubular shape extending along the axis P of the stator core 100.

The stator core 100 has stator core end surfaces 100A and 100B on the first and second sides in the axial direction, respectively, and has a stator core outer peripheral surface 102 on the radially outer side and a stator core inner peripheral surface on the radially inner side. The stator core inner peripheral surface is formed by tooth tip surfaces 122*a* (described below) of each of a plurality of teeth 120.

The stator core 100 includes a yoke 110 and the teeth 120 as shown in FIG. 2.

The yoke 110 extends in the circumferential direction around the axis P. The teeth 120 are spaced apart from each other in the circumferential direction and extend radially inward from the yoke 110.

Each of the teeth 120 has a tooth base 121 and a tooth tip 122. Each tooth base 121 extends radially inward from the yoke 110. Each tooth tip 122 is formed (provided, disposed, defined) on the radially inner side of the corresponding tooth base 121 and extends in the circumferential direction. The tooth tip 122 has a circular-arc-shaped tooth tip surface 122*a* on the radially inner side.

Pairs of the teeth 120 that are adjacent to each other in the circumferential direction respectively define slots 130 therebetween.

The tooth tip surfaces 122*a* form (define) the stator core inner peripheral surface. Furthermore, the tooth tip surfaces 122*a* define a stator core interior space 100*a* in which the rotor 50 (rotor core 60) is arranged (disposed).

The stator core 100 is housed in the housing interior space with the stator core outer peripheral surface 102 in close contact with the housing inner peripheral surface 21. In this embodiment, the housing inner peripheral surface 21 and the stator core outer peripheral surface 102 have a circular (or generally circular) section.

Parts of the circular (or generally circular) stator core outer peripheral surface 102 are flattened to form flat (notched) surfaces 103. The flat surfaces 103 and the housing inner peripheral surface 21 define a passage 104 extending in the axial direction. The cooling medium flows through the passage 104.

The cross-sectional shapes of the housing inner peripheral surface 21, the stator core outer peripheral surface 102 and the passage 104 can be appropriately changed.

The first electrical insulator assembly 200 and the second electrical insulator assembly 300 are formed (composed) of a material having electrical insulating properties. In this embodiment, a polymer having electrical insulating properties is used.

The first electrical insulator assembly 200 (hereinafter simply referred to as a "first assembly 200") is arranged on the first side of the stator core 100 in the axial direction such that an end surface 200A of the first assembly 200 faces the stator core end surface 100A.

Figure 4:
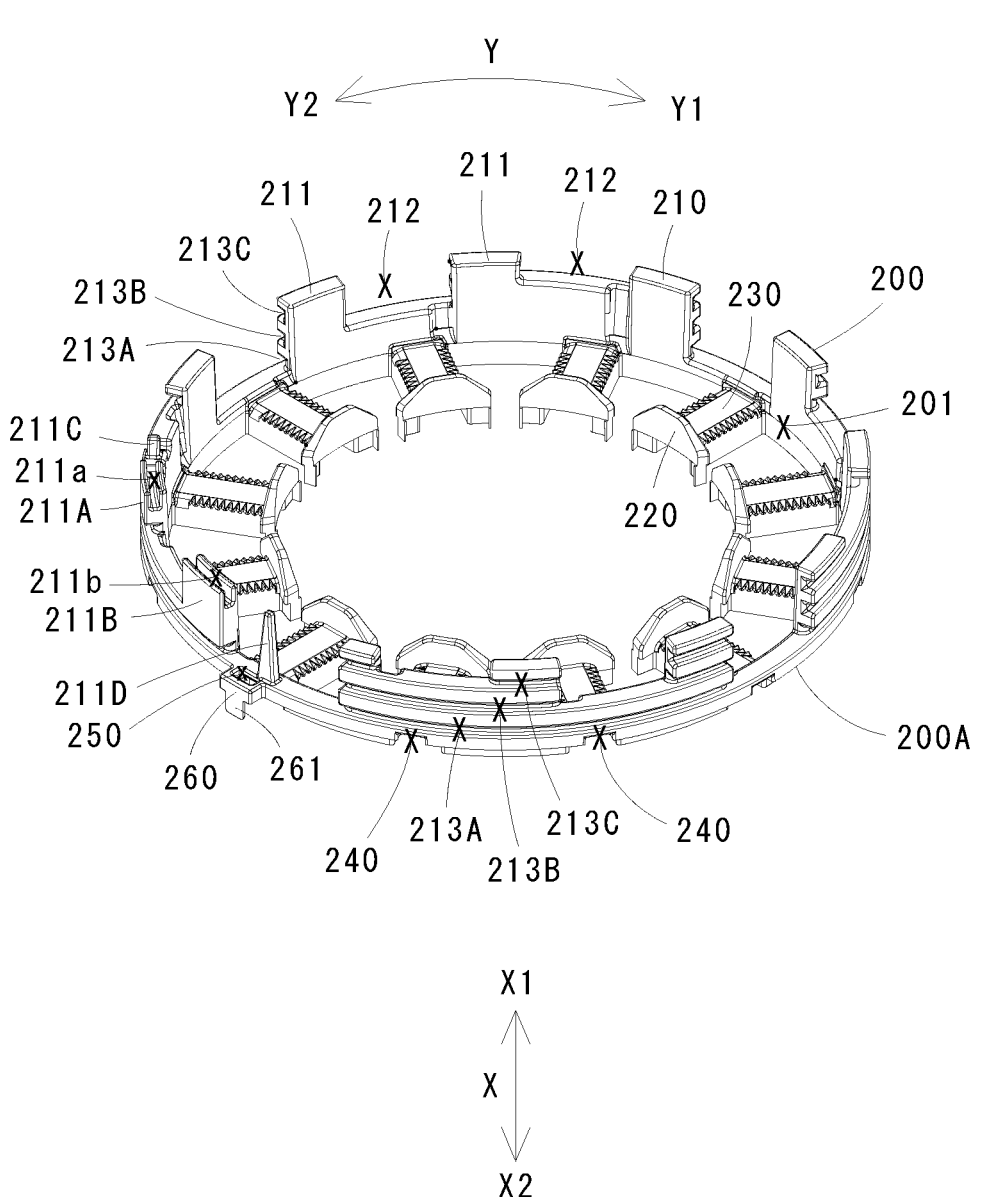
FIG. 4 is a perspective view of a first electrical insulator assembly of the motor of FIG. 3.

As shown in FIG. 4, the first assembly 200 has an outer wall part 210, inner wall parts 220 and body parts 230.

The outer wall part 210 extends in the circumferential direction and the axial direction.

The inner wall parts 220 are arranged radially inward of the outer wall part 210 and are spaced apart from each other in the circumferential direction and extend in the circumferential direction and the axial direction.

The body parts 230 are arranged on the second side (the stator core 100 side) in the axial direction between the outer wall part 210 and the inner wall parts 220 and extend radially.

The outer wall part 210, the inner wall parts 220 and the body parts 230 define a recess 201 that extends in the circumferential direction between the outer wall part 210 and the inner wall parts 220 and is open on the first side (the opposite side to the stator core 100) in the axial direction. In this embodiment, the first assembly 200 is arranged on the first side of the stator core 100 in the axial direction such that the outer wall part 210, the body parts 230 and the inner wall parts 220 face the yoke 110, the tooth bases 121 and the tooth tips 122 of the stator core 100, respectively.

The outer wall part 210 has notches 212 extending in the circumferential direction. The outer wall part 210 has projections 211 respectively formed (provided, disposed) between the circumferentially adjacent notches 212 that extend in the circumferential direction and protrude toward the first side in the axial direction (the opposite side to the stator core 100).

Figure 3:
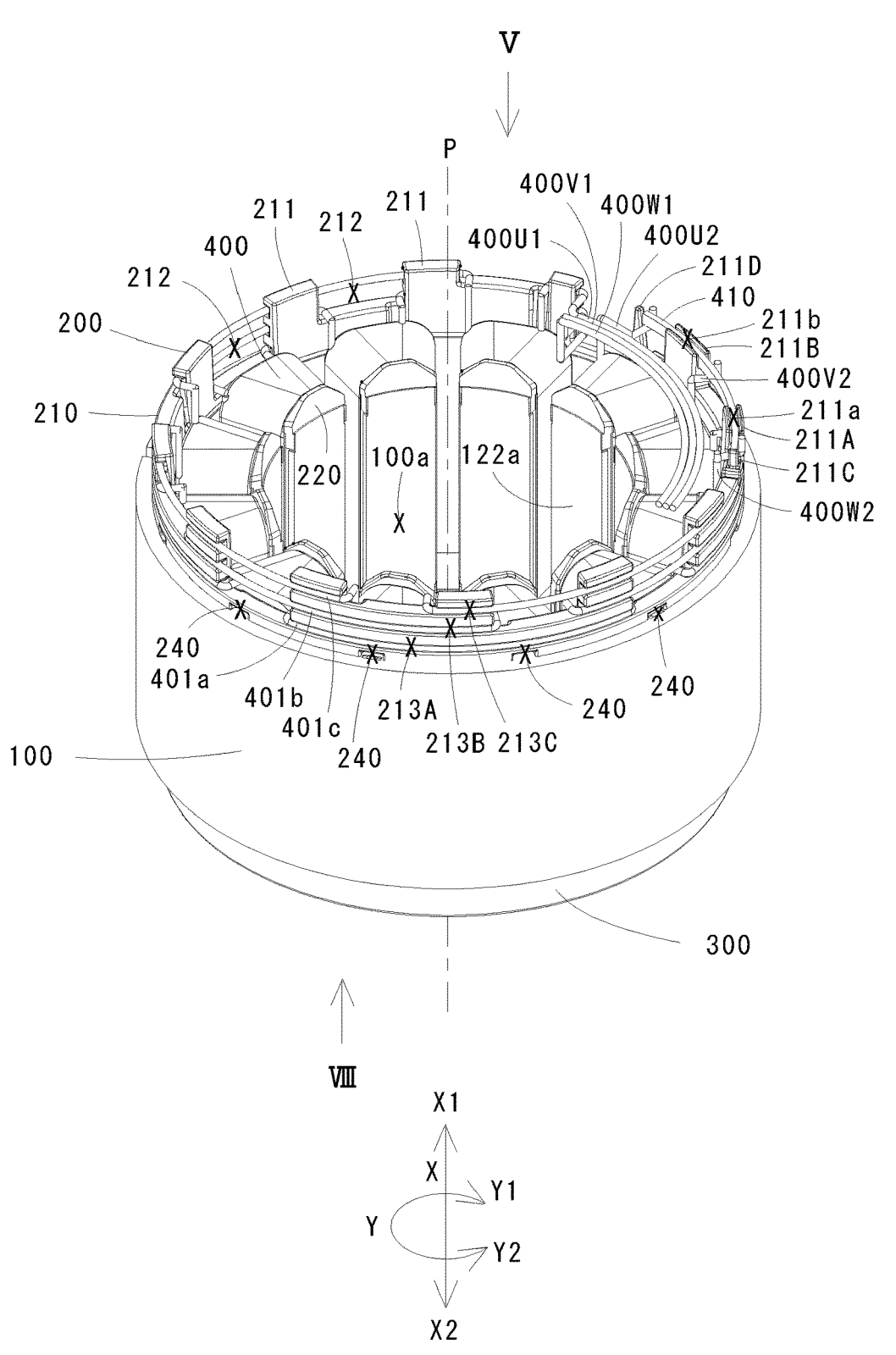
FIG. 3 is a perspective view of a part of a motor of an embodiment of the present disclosure.

Crossover parts 401a, 401b, 401c (described below) of the stator winding 400 are drawn out from the inside to the outside of the outer wall part 210 or drawn back from the outside to the inside of the outer wall part 210 through the notches 212, as can be seen in FIG. 3.

Guide grooves 213A, 213B, 213C are formed (provided, defined) on an outer peripheral surface of the outer wall part 210 and extend in the circumferential direction, as can also be seen in FIG. 3. The guide grooves 213A, 213B, 213C are spaced apart from each other in the axial direction. The crossover parts 401a, 410b, 401c drawn out from the inside to the outside of the outer wall part 210 through the notches 212 are arranged along the outer peripheral surface of the outer wall part 210. At this time, the crossover parts 401a, 401b, 401c are respectively guided through any one of the guide grooves 213A, 213B, 213C and thereby prevented (blocked, restrained) from coming into contact with each other. The guide grooves 213A, 213B, 213C are each separated into parts by the notches 212.

The positions in the circumferential direction, the lengths in the circumferential direction and the depths in the axial direction of the notches 212 (the positions in the circumferential direction and the lengths in the circumferential direction of the projections 211) are set based on positions where the crossover parts 401a, 401b, 401c are drawn out from the inside to the outside of the outer wall part 210 or drawn back from the outside to the inside of the outer wall part 210.

The outer wall part 210 has a first movement restriction part (first movement restricting part, first movement preventing part) and a second movement restriction part (second movement restricting part, second movement preventing part).

The first movement restriction part restricts (prevents, blocks, restrains, limits) a neutral point bus bar 410 (described below), which forms a neutral point of the stator winding 400, from moving radially inward and outward and toward the second side (the stator core 100 side) in the axial direction.

The second movement restriction part restricts (prevents, blocks, restrains, limits) the neutral point bus bar 410 from moving toward the first and second sides in the circumferential direction.

First, the first movement restriction part will be described.

Figure 5:
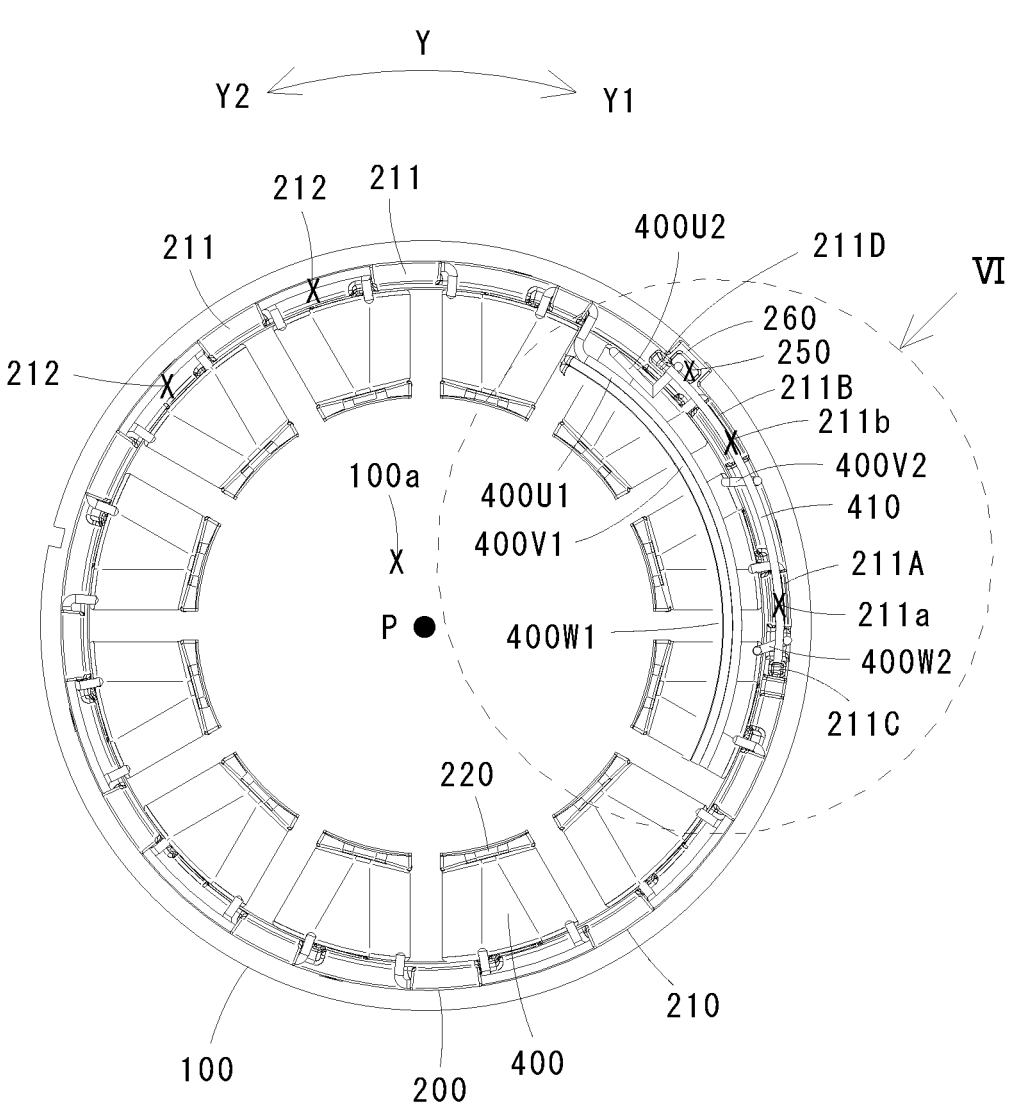
FIG. 5 is a view of the part of the motor of FIG. 3 in the direction of arrow V in FIG. 3.
Figure 6:
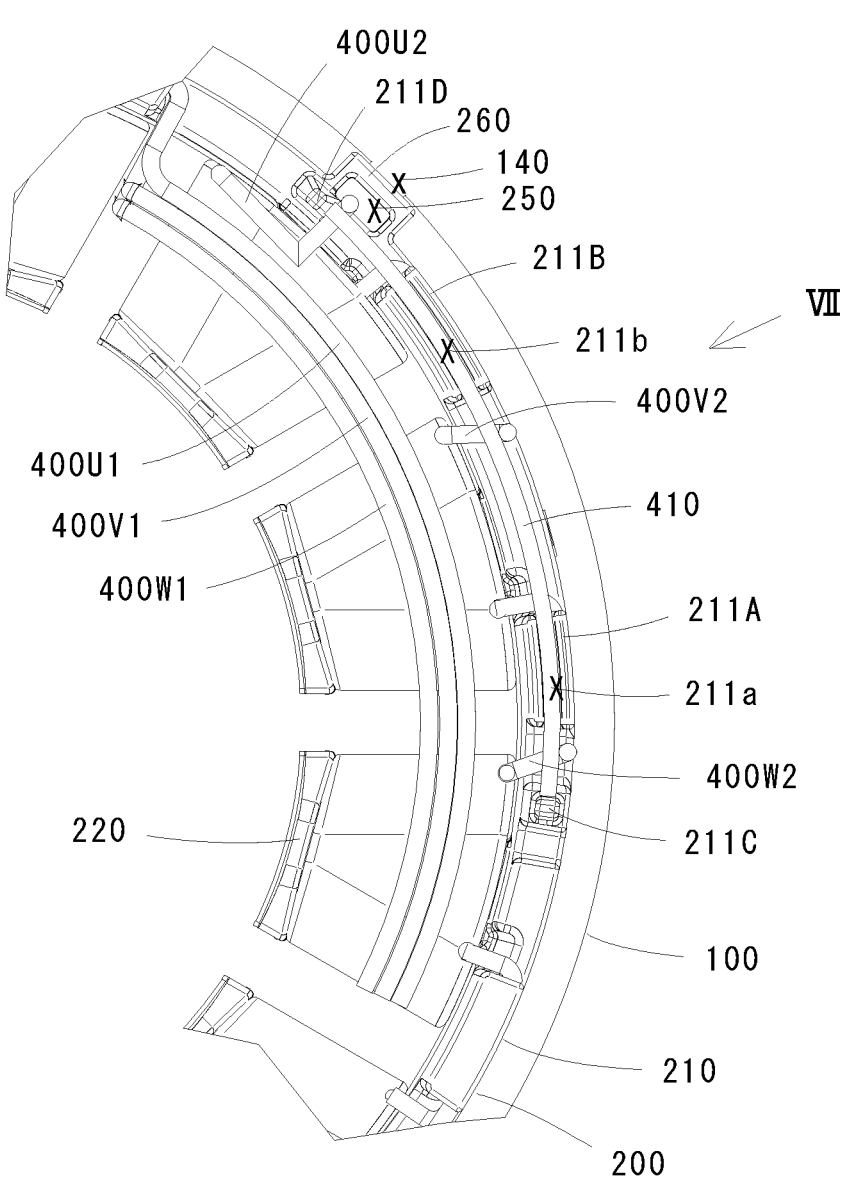
FIG. 6 is an enlarged view of region VI of FIG. 5.

At least one of the projections 211 has a groove extending in the circumferential direction. In this embodiment, as shown in FIGS. 3, 5 and 6, two projections 211A and 211B adjacent in the circumferential direction have respective grooves 211a and 211b.

The groove 211a is formed (defined) at (on, in) an end surface of the projection 211A on the first side (the opposite side to the stator core 100) in the axial direction and is open on the first side (the opposite side to the stator core 100) in the axial direction and on the first and second sides in the circumferential direction. Specifically, the groove 211a has wall surfaces on the radially inner and outer sides and on the second side in the axial direction.

Similarly, the groove 211b is formed (defined) at (on, in) an end surface of the projection 211B on the first side in the axial direction and is open on the first side in the axial direction and the first and second sides in the circumferential direction. Specifically, the groove 211b has wall surfaces on the radially inner and outer sides and on the second side in the axial direction.

The grooves 211a, 211b are formed such that the neutral point bus bar 410 can be inserted in the grooves 211a, 211b of two adjacent projections 211A, 211B while spanning (straddling) the notch 212 between the projections 211A, 211B.

The wall surfaces of the grooves 211a, 211b restrict (prevent, block, restrain, limit) the neutral point bus bar 410 inserted in the grooves 211a, 211b from moving radially inward and outward and toward the second side in the axial direction.

In this embodiment, the projections 211A, 211B are examples of an "at least one projection" according to this disclosure. The grooves 211a, 211b respectively formed (defined) in the projections 211A, 211B correspond to a "first movement restriction part that is configured to restrict (prevent, block, restrain, limit) the neutral point part from moving inward and outward in the radial direction and toward the stator core side in the axial direction" according to this disclosure.

Next, the second movement restriction part will be described.

In this embodiment, the projections 211 other than the projections 211A, 211B having the respective grooves 211*a*, 211*b* are configured to restrict (prevent, block, restrain, limit) the neutral point bus bar 410 from moving toward the first and second sides in the circumferential direction.

Specifically, a projection 211C is formed on the first side of the projection 211A in the circumferential direction, which projection 211A is arranged on the first side of the projection 211B in the circumferential direction and is configured to restrict (prevent, block, restrain, limit) the neutral point bus bar 410 in the grooves 211*a*, 211*b* from moving toward the first side in the circumferential direction.

For example, when the neutral point bus bar 410 is in the grooves 211*a*, 211*b* and moves toward the first side in the circumferential direction, the neutral point bus bar 410 abuts on an abutment part of the projection 211C and thereby is restricted from moving further toward the first side in the circumferential direction.

Furthermore, a projection 211D is formed (defined) on the second side of the projection 211B in the circumferential direction, which projection 211B is arranged on the second side of the projection 211A in the circumferential direction and is configured to restrict (prevent, block, restrain, limit) the neutral point bus bar 410 in the grooves 211*a*, 211*b* from moving toward the second side in the circumferential direction.

For example, when the neutral point bus bar 410 is inserted in the grooves 211*a*, 211*b* and moves toward the second side in the circumferential direction, the neutral point bus bar 410 abuts on an abutment part of the projection 211D and thereby is restricted from further moving toward the second side in the circumferential direction.

In this embodiment, the projection 211C corresponds to a "second movement restriction part that is arranged on the first side of at least one of the projections in the circumferential direction and is configured to restrict (prevent, block, restrain, limit) movement of the neutral point part toward the first side in the circumferential direction" according to this disclosure. The projection 211D corresponds to a "second movement restriction part that is arranged on the second side of at least one of the projections in the circumferential direction and configured to restrict (prevent, block) movement of the neutral point part toward the second side in the circumferential direction" according to this disclosure.

The second electrical insulator assembly 300 (hereinafter simply referred to as a "second assembly 300") is arranged (disposed) on the second side of the stator core 100 in the axial direction such that an end surface 300A of the second assembly 300 faces the stator core end surface 100B, as can be seen in FIGS. 1 and 3.

Like the first assembly 200, the second assembly 300 has an outer wall part 310, inner wall parts 320 and body parts 230 (see FIG. 1).

The outer wall part 310, the inner wall parts 320 and the body parts 330 define a recess 301 that extends in the circumferential direction between the outer wall part 310 and the inner wall parts 320 and is open on the second side (the opposite side to the stator core 100) in the axial direction.

In this embodiment, the crossover parts 401*a*, 401*b*, 401*c* between winding parts are arranged along the outer peripheral surface of the outer wall part 210 of the first assembly 200, as described below.

Therefore, parts correspond respectively to the projections 211, the notches 212 and the guide grooves 213A to 213C formed in the outer wall part 210 of the first assembly 200 can be omitted in the outer wall part 310 of the second assembly 300.

The second assembly 300 may of course have the same shape or configuration as the first assembly 200.

The stator winding 400 includes a U-phase stator winding (coils), a V-phase stator winding (coils) and a W-phase stator winding (coils).

As shown in FIGS. 3, 5 and 6, the U-, V- and W-phase stator windings 400 include winding parts (coils), first lead parts 400U1, 400V1 and 400W1 and second lead parts 400U2, 400V2 and 400W2. Each of the winding parts is formed by a lead wire composed of a conductive material (such as a copper wire) being wound around the respective tooth 120 (specifically, the tooth bases 121) of the stator core 100 in a state in which the first and second assemblies 200, 300 are respectively arranged (disposed) on the first and second sides of the stator core in the axial direction.

Each of the phase stator windings includes stator winding portions connected in series or in parallel.

Each of the stator winding portions has at least one winding part (coil).

Each winding part has a winding start end and a winding finish end.

Winding start part (wire) extends from the winding start end of the winding part.

Winding finish part (wire) extends from the winding finish end of the winding part.

The first lead parts (first lead wires) 400U1, 400V1 and 400W1 of each of the phase stator windings are selected from the winding start parts connected to winding parts that form the U-, V- and W-phase stator windings. The second lead parts (second lead wires) 400U2, 400V2 and 400W2 of each of the phase stator windings are selected from the winding finish parts connected to winding parts that form the U-, V and W-phase stator windings.

The winding start parts and the winding finish parts that are not respectively selected as the first lead parts and the second lead parts are used as the crossover parts (crossover wires) 401*a*, 401*b*, 401*c* (see FIG. 3) that connect and extend between the winding parts.

In this embodiment, the crossover parts 401*a*, 401*b*, 401*c* are drawn out from the inside to the outside of the outer wall part 210 through any of the notches 212 of the outer wall part 210 of the first assembly 200. Then, the crossover parts 401*a*, 401*b*, 401*c* are guided by the guide grooves 213A, 213B, 213C formed on the outer peripheral surface of the outer wall part 210 and arranged along the outer peripheral surface of the outer wall part 210. Subsequently, the crossover parts 401*a*, 410*b*, 401*c* are drawn back from the outside to the inside of the outer wall part 210 through any of the other notches 212.

In this embodiment, the first lead parts 400U1, 400V1 and 400W1 of the U-, V and W-phase stator windings are connected to a power supply. The second lead parts 400U2, 400V2 and 400W2 of the U-, V and W-phase stator windings are connected in common to the neutral point bus bar 410 so that the neutral point bus bar 410 forms (provides, defines) a neutral point. Thus, the U-, V and W-phase stator windings are star-connected.

In this embodiment, the U-phase stator winding, V-phase stator winding and W-phase stator winding correspond to examples of "stator windings of first, second and third phases" according to this disclosure. The first lead parts 400U1, 400V1 and 400W1 correspond to examples of "first lead parts connected to a power supply" according to this disclosure. The second lead parts 400U2, 400V2 and 400W2 correspond to examples of "second lead parts connected in common" according to this disclosure.

The second lead parts 400U2, 400V2 and 400W2 connected in common are routed in the circumferential direction within the recess 201 of the first assembly 200.

The second lead parts 400U2, 400V2 and 400W2, if not restricted from moving, could potentially move and come into contact with any other electrical component. Therefore, the movement of the second lead parts 400U2, 400V2 and 400W2 needs to be restricted.

The structures for restricting (preventing, blocking, limiting, restraining) movement of the second lead parts 400U2, 400V2 and 400W2 in the motor of this embodiment will be described with reference to FIGS. 3 and 5 to 7.

In this embodiment, the second lead parts 400U2, 400V2 and 400W2 of the respective phases are connected to the neutral point bus bar 410.

The neutral point bus bar 410 is formed (composed) of a conductive material. In this embodiment, the neutral point bus bar 410 is formed (composed) of copper.

The neutral point bus bar 410 is configured to be insertable in the grooves 211a, 211b formed in the projections 211A, 211B of the first assembly 200, while spanning (straddling) the notch 212 between the projections 211A, 211B. For example, the neutral point bus bar 410 is formed in a plate-like shape extending in an arc so as to be insertable in the grooves 211a, 211b.

Furthermore, the neutral point bus bar 410 has a length shorter than a distance between the projections 211C and 211D, which together serve as the second movement restriction part, in the circumferential direction.

The neutral point bus bar 410 can be formed (produced) by various methods. For example, it can be formed by pressing (stamping, rolling) a round bar or a copper plate, or it can be formed from a wire that is round or square wire or that has another shape.

In this embodiment, the neutral point bus bar 410 to which the second lead parts 400U2, 400V2 and 400W2 are connected in common constitutes a "neutral point part to which the second lead parts of the stator windings of the first to third phases are connected in common" according to this disclosure.

The neutral point bus bar 410 is inserted into the grooves 211a, 211b formed in the projections 211A, 211B of the outer wall part 210 of the first assembly 200 with the second lead parts 400U2, 400V2 and 400W2 connected to the neutral point bus bar 410.

Alternatively, the second lead parts 400U2, 400V2 and 400W2 may be connected to the neutral point bus bar 410 with the neutral point bus bar 410 inserted into the grooves 211a, 211b.

A known connecting method is used to connect the second lead parts 400U2, 400V2 and 400W2 to the neutral point bus bar 410.

In this state, the wall surfaces of the groove 211a, 211b restrict the neutral point bus bar 410 from moving radially inward and outward and toward the second side (the stator core 100 side) in the axial direction. Furthermore, the projection 211C restricts the neutral point bus bar 410 from moving toward the first side in the circumferential direction, and the projection 211D restricts the neutral point bus bar 410 from moving toward the second side in the circumferential direction.

In this embodiment, the grooves 211a, 211b formed (defined) in the projections 211A, 211B of the outer wall part 210 of the first assembly 200 and the projections 211C, 211D of the outer wall part 210 of the first assembly 200 restrict movement of the neutral point bus bar 410 to which the second lead parts 400U2, 400V2 and 400W2 are connected in common.

Thus, movement of the second lead parts 400U2, 400V2 and 400W2 can be easily restricted using a simple structure.

The cover 500 is arranged on the first side (the opposite side to the stator core 100) of the first assembly 200 in the axial direction, as shown in FIG. 1.

The cover 500 is formed (composed) of a material having electrical insulating properties. In this embodiment, the cover 500 is formed (composed) of a polymer having electrical insulating properties.

The structure of the cover 500 will now be described in further detail with reference to FIGS. 9 to 13.

The cover 500 includes a peripheral (circumferential) wall 510 and a top wall 520.

The peripheral wall 510 extends in the circumferential direction and the axial direction and has a circular inner peripheral surface and a circular outer peripheral surface. The peripheral wall 510 is arranged (disposed, located) outside of the outer wall part 210 (the crossover parts 401a, 401b, 401c) of the first assembly 200 in a state in which the crossover parts 401a, 401b, 401c are respectively inserted in the guide grooves 213A, 213B, 213C formed on the outer peripheral surface of the outer wall part 210 of the first assembly 200.

The top wall 520 is connected to an end of the peripheral wall 510 on the first side (the opposite side to the stator core 100) in the axial direction and extends radially and in the circumferential direction. In this embodiment, the top wall 520 extends in a direction orthogonal (or substantially orthogonal) to the axial direction. The top wall 520 has an opening 520a in its center. The first lead parts 400U1, 400V1 and 400W1 through the opening 520a of the top wall 520.

The cover 500 is detachably mounted on the first assembly 200 via mounting mechanisms at a plurality of positions spaced apart from each other in the circumferential direction.

In this embodiment, each of the mounting mechanisms includes a locking piece having a claw and an engagement recess configured to be engaged with the claw of the locking piece. In this embodiment, the locking piece is formed in (on) the peripheral wall 510 of the cover 500, and the engagement recess is formed in the outer wall part 210 of the first assembly 200.

Furthermore, in this embodiment, two different mounting mechanisms (first and second mounting mechanisms) are provided, each including a locking piece with a claw and an engagement recess. An appropriate one of the mounting mechanisms is selectively used according to the mounting position.

First, the first mounting mechanism will be described.

Figure 11:
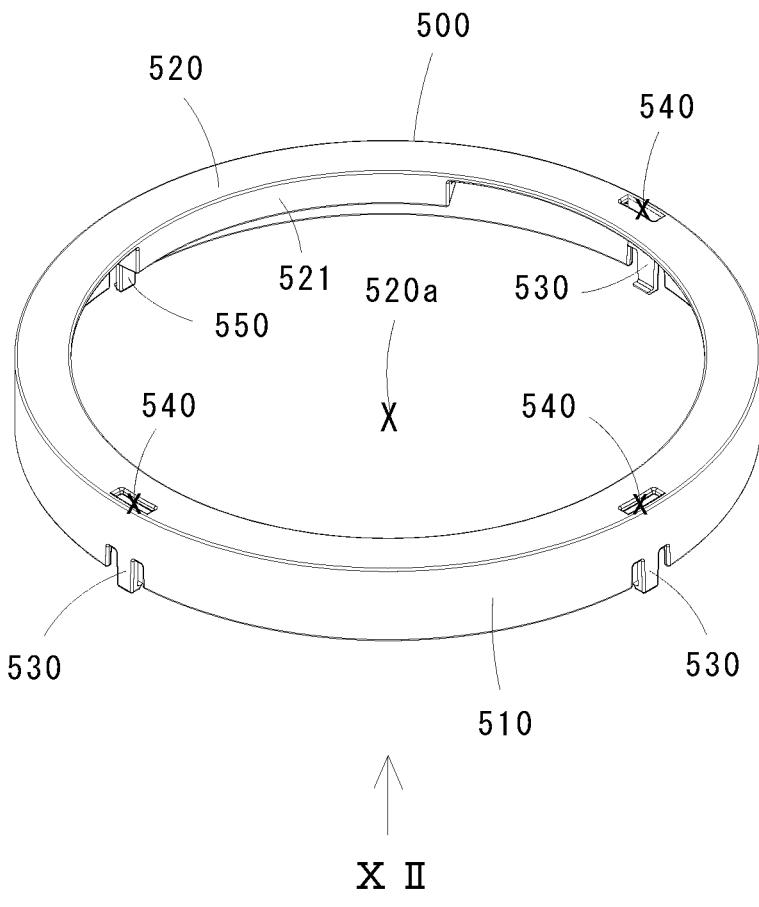
FIG. 11 is a perspective view of a first embodiment of a cover that may be used in (with, on) the motor of the one embodiment.
Figure 13:
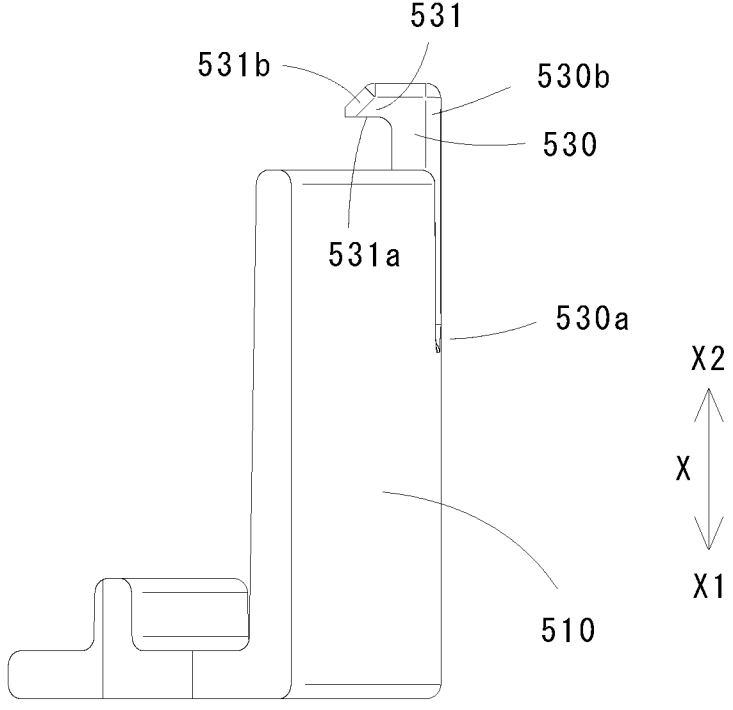
FIG. 13 is a sectional view of the cover taken along line XIII-XIII in FIG. 12.
Figure 15:
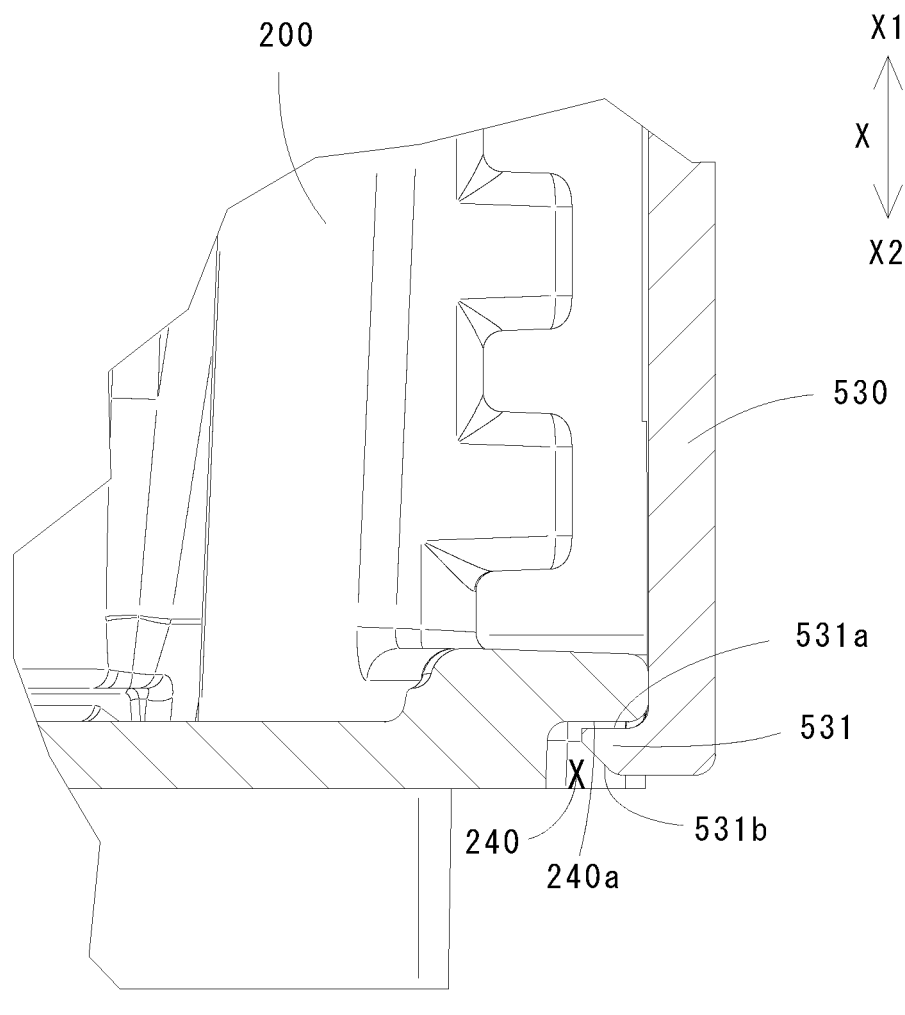
FIG. 15 is a sectional view of the cover taken along line XV-XV in FIG. 10.

As shown in FIGS. 11, 13 and 15, the first mounting mechanism includes a first locking piece 530 formed (provided, disposed) on the peripheral wall 510 of the cover 500 and a first engagement recess 240 formed in the outer wall part 210 of the first assembly 200.

The first locking piece 530 extends in the axial direction. The first locking piece 530 has an end part 530a on the first side (the opposite side to the stator core 100) in the axial direction that is a fixed end fixed to the peripheral wall 510 and an end part 530b on the second side (the stator core 100 side) in the axial direction that is a free end. The first locking piece 530 is configured such that the end part (free end) 530b on the second side in the axial direction can be elastically deformed in a radial direction relative to the end part (fixed end) 530a on the first side in the axial direction.

The first locking piece 530 has a claw 531 on the end part 530b on the second side (the stator core 100 side) in the axial direction. The claw 531 has a locking surface (engagement surface) 531a and an inclined (cam) surface 531b. The inclined surface 531b is inclined radially inward toward the first side in the axial direction from an end on the second side in the axial direction. The locking surface 531a extends radially outward from an end of the inclined surface 531b on the first side in the axial direction. In this embodiment, the locking surface 531a extends in a direction orthogonal (or substantially orthogonal) to the axial direction.

As shown in FIG. 15, the first locking piece 530 has the claw 531 protruding radially inward.

The first engagement recess 240 is formed at an end part of the outer peripheral surface of the outer wall part 210 of the first assembly 200 on the second side in the axial direction and is open on the radially outer side and the second side in the axial direction. The first engagement recess 240 has a locking surface (engaged surface) 240a that extends in the direction orthogonal (or substantially orthogonal) to the axial direction on the first side in the axial direction and configured to be engageable (engaged) with (by) the locking surface 531a of the claw 531 of the first locking piece 530.

Next, the second mounting mechanism will be described.

Figure 12:
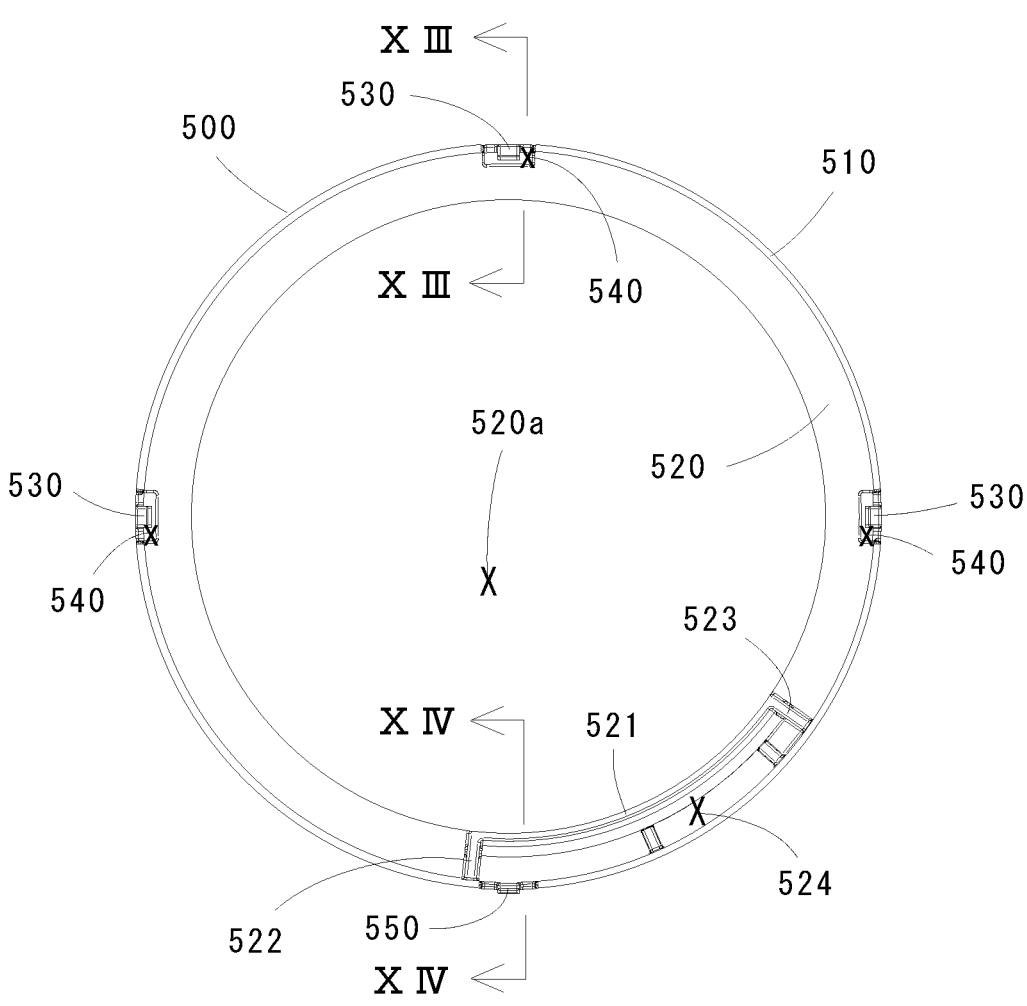
FIG. 12 is a view of the cover of FIG. 11 in the direction of arrow XII in FIG. 11.
Figure 14:
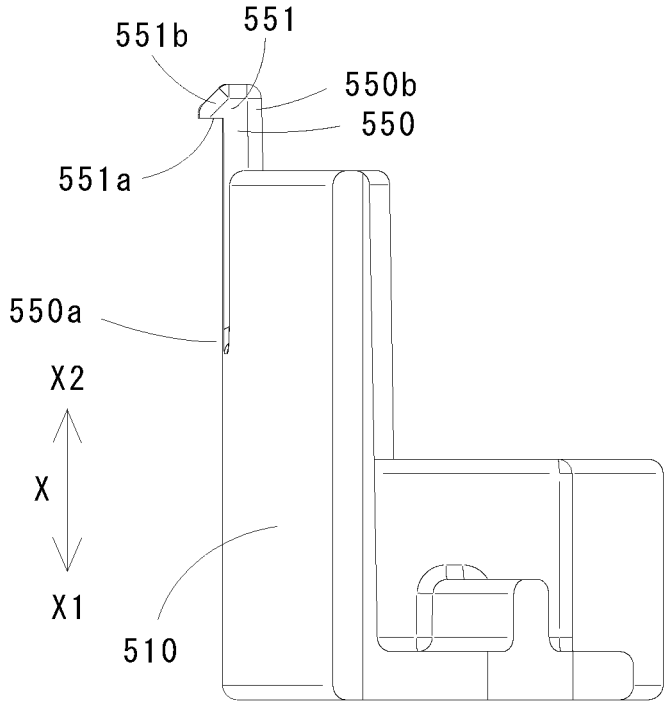
Figure 16:
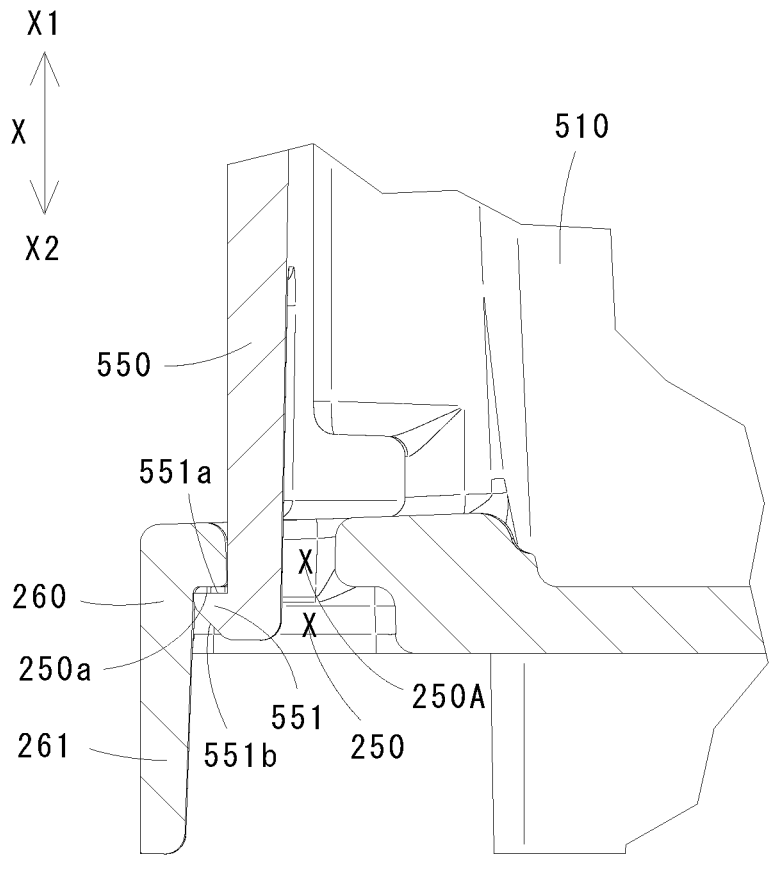
FIG. 16 is a sectional view of the cover taken along line XVI-XVI in FIG. 10.

As shown in FIGS. 12, 14 and 16, the second mounting mechanism includes a second locking piece 550 formed (provided, disposed) in (on) the peripheral wall 510 of the cover 500 and a second engagement recess 250 formed (provided, defined) in in the outer wall part 210 of the first assembly 200.

The second locking piece 550 extends in the axial direction. The second locking piece 550 has an end part 550a (fixed end) on the first side (the opposite side to the stator core 100) in the axial direction that is a fixed end fixed to the peripheral wall 510 and an end part 550b on the second side (the stator core 100 side) in the axial direction that is a free end. The second locking piece 550 is configured such that the end part (free end) 550b on the second side in the axial direction can be elastically radially deformed relative to the end part (fixed end) 550a on the first side in the axial direction.

The second locking piece 550 has a claw 551 on the end part 550b on the second side (the stator core 100 side) in the axial direction. The claw 551 has a locking surface (engagement surface) 551a and an inclined (cam) surface 551b. The inclined surface 551b is inclined radially outward toward the first side in the axial direction from an end on the second side in the axial direction. The locking surface 551a extends radially inward from an end of the inclined surface 551b on the first side in the axial direction. In this embodiment, the locking surface 551a extends in a direction orthogonal (or at least substantially orthogonal) to the axial direction.

The second locking piece 550 has the claw 551 that protrudes radially outward.

As shown in FIGS. 4 and 6, a projection 260 is formed at a position on an end part of the outer wall part 210 of the first assembly 200 on the second side in the axial direction where the engagement recess 250 is formed. The projection 260 protrudes radially outward. The second engagement recess 250 is formed in the projection 260.

As shown in FIG. 16, the second engagement recess 250 has an insertion opening 250A formed on the first side in the axial direction through which the claw 551 of the second locking piece 550 is insertable. In the second engagement recess 250, a locking surface (engaged surface) 250a extending radially outward from an end of the insertion opening 250A on the second side in the axial direction is formed. The locking surface 250a is configured so as to be engageable (engaged) with (by) the locking surface 551a of the claw 551 of the second locking piece 550.

Figure 7:
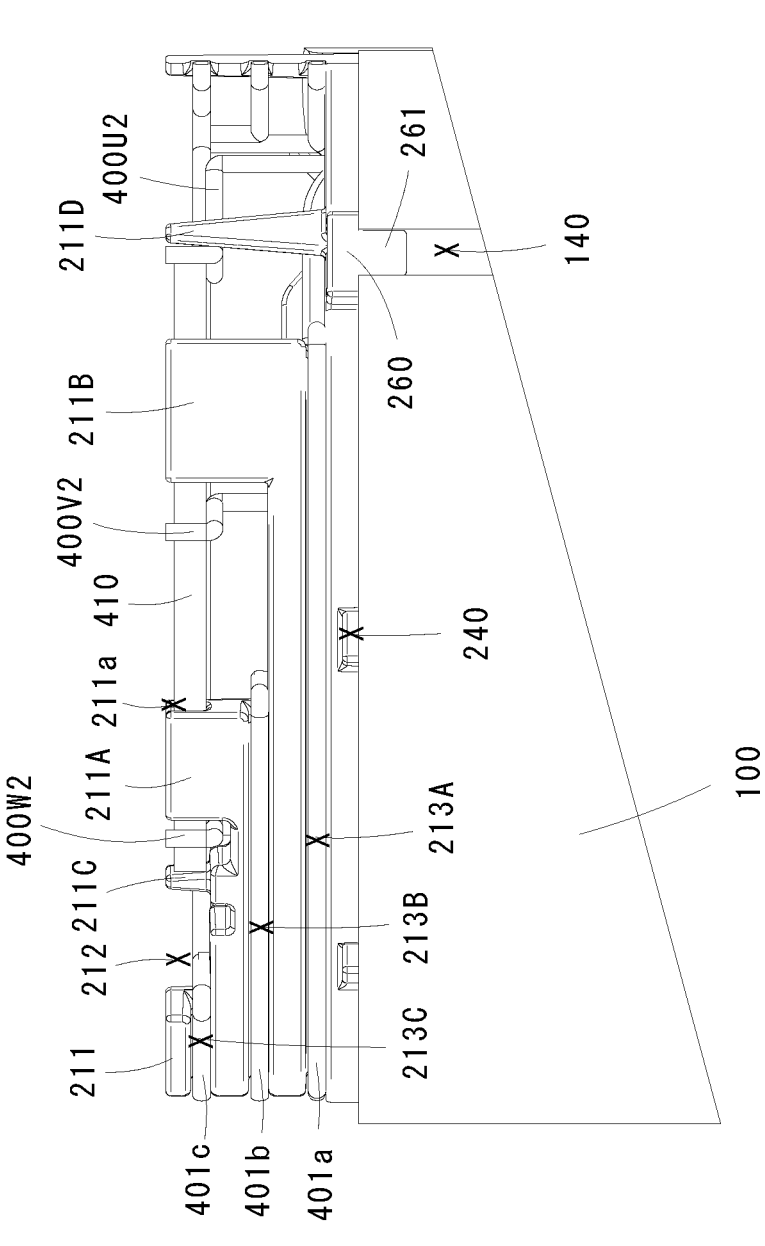
FIG. 7 is a view of the part of the motor shown in FIG. 6 in the direction of arrow VII in FIG. 6.
Figure 8:
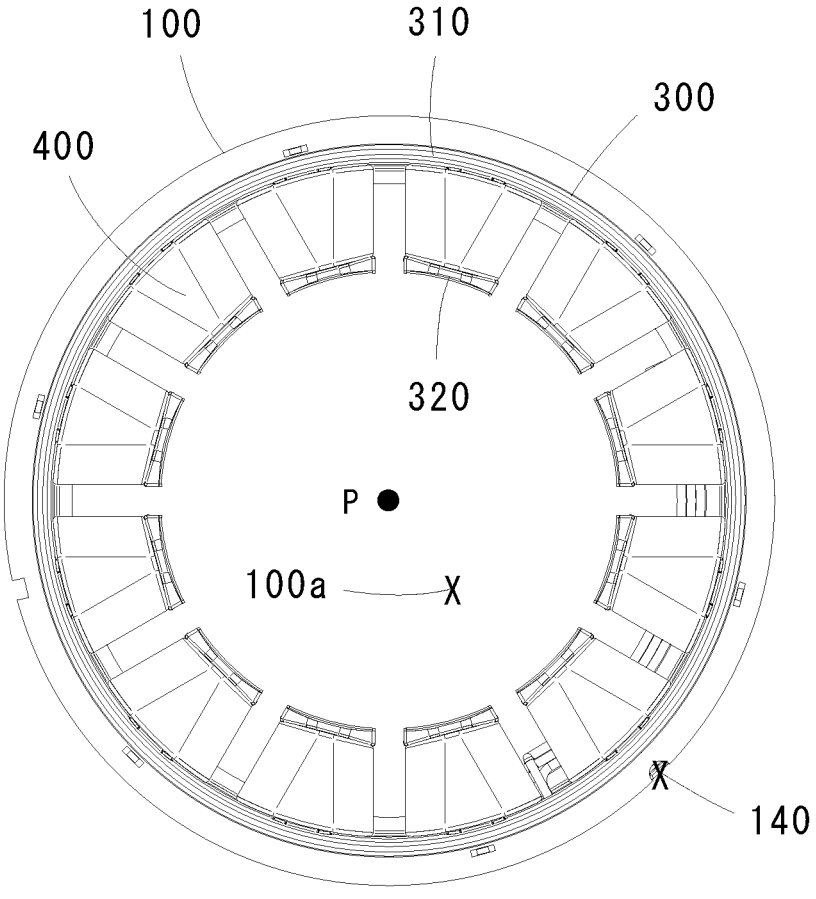
FIG. 8 is a view of the part of the motor of FIG. 3 in the direction of arrow VIII in FIG. 3.
Figure 9:
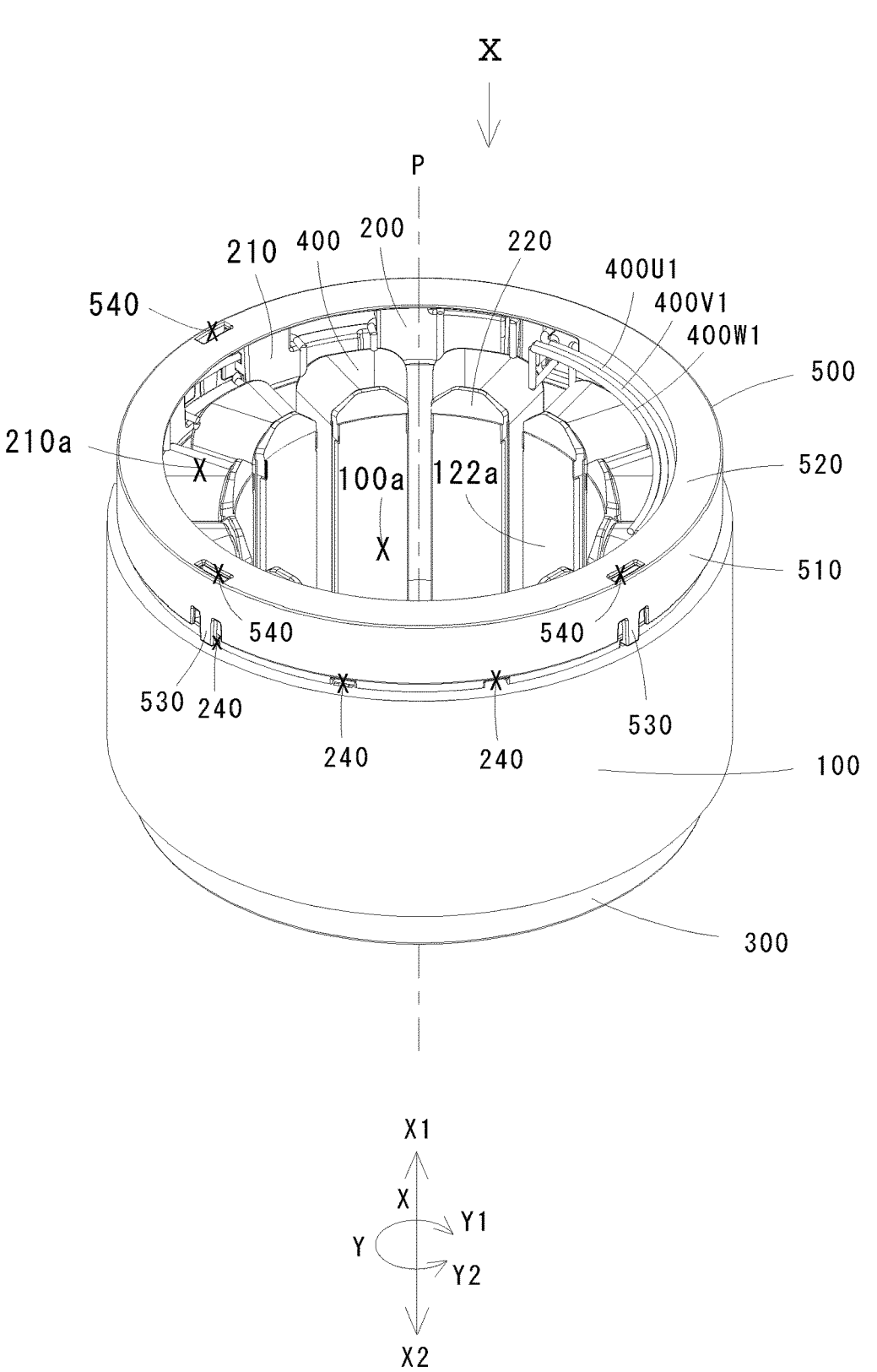
FIG. 9 is a perspective view of the motor of the above-mentioned embodiment including a cover.
Figure 10:
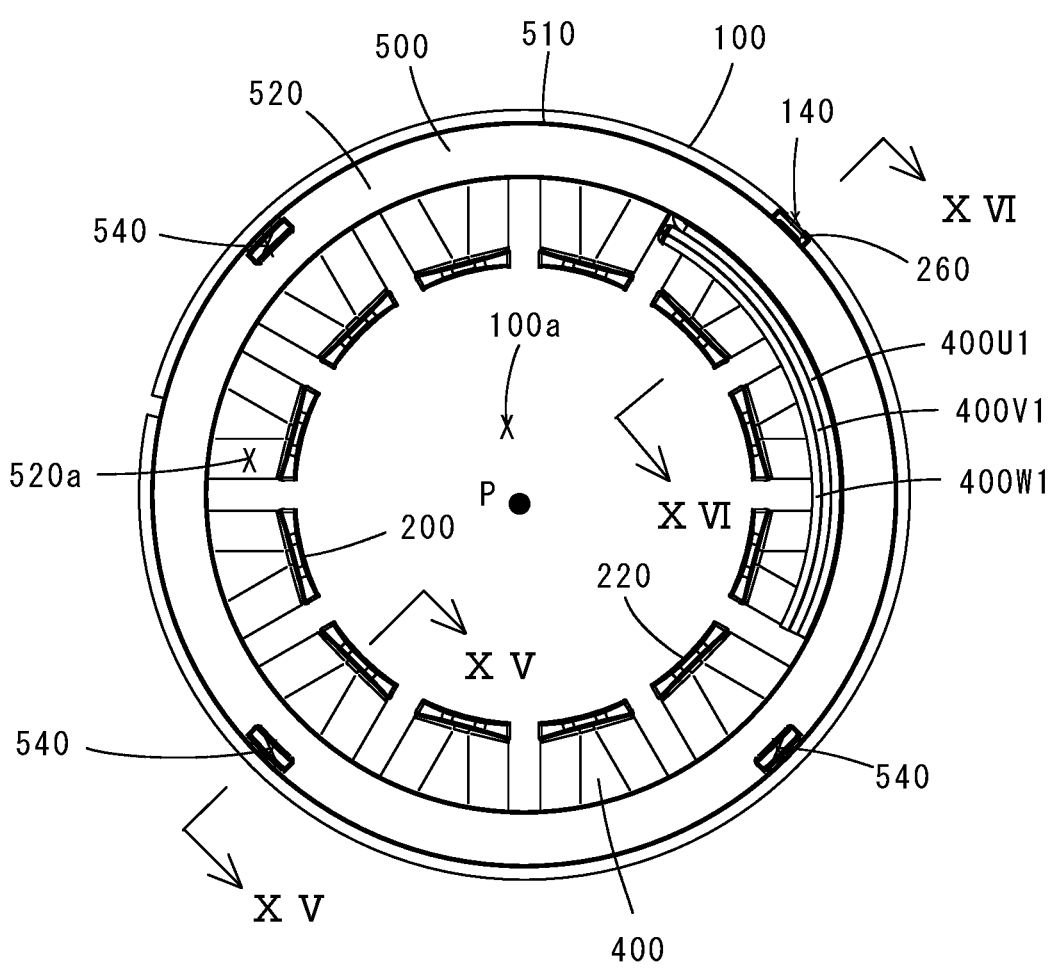
FIG. 10 is a view of the motor of FIG. 9 as viewed in the direction of arrow X in FIG. 9.

As shown in FIGS. 4 and 7, the projection 260 of the first assembly 200 has a positioning projection 261 protruding toward the second side in the axial direction. The positioning projection 261 extends in the axial direction.

Furthermore, a positioning recess 140 is formed on the outer peripheral surface 102 of the stator core 100. The positioning recess 140 extends in the axial direction and is open on the first side in the axial direction such that the positioning projection 261 is insertable therein. In this embodiment, the positioning recess 140 has an opening to the end surface 100A of the stator core 100 on the first side in the axial direction.

When arranging the first assembly 200 on the first side of the stator core 100 in the axial direction, the positioning projection 261 formed on the projection 260 of the first assembly 200 is inserted into the positioning recess 140 formed in the outer peripheral surface 102 of the stator core 100. Thus, the first assembly 200 can be easily positioned on the stator core 100.

In this embodiment, the positioning projection 261 and the positioning recess 140 constitute a positioning mechanism.

The positioning projection 261 is formed on the projection 260 that protrudes radially outward on the outer wall part 210 of the first assembly 200, and the positioning recess 140 is formed on the outer peripheral surface of the stator core 100. With this arrangement, the positioning projection 261 can be easily inserted into the positioning recess 140, and the first assembly 200 can be easily assembled on the stator core 100.

A plurality of positioning mechanisms may be provided. Furthermore, the positioning mechanism is not limited to a positioning mechanism that includes the positioning projection 261 and the positioning recess 140.

In this embodiment, the cover 500 is mounted on the first assembly 200 via the mounting mechanisms at four positions (points) in the circumferential direction. In this embodiment, the first mounting mechanism (the first locking piece 530, the first engagement recess 240) is provided at each of three of the four positions, and the second mounting mechanism (the second locking piece 550, the second engagement recess 250) is provided at the other one position.

When mounting the cover 500 on the first assembly 200, the cover 500 is placed on the first side of the first assembly 200 in the axial direction such that each locking piece (the first locking piece 530, the second locking piece 550) formed in the peripheral wall 510 of the cover 500 faces a corresponding engagement recess (the first engagement recess 240, the second engagement recess 250) formed in the outer wall part 210 of the first assembly 200. Then, the cover 500 is moved toward the second side (the stator core 100 side) in the axial direction.

When the cover 500 is moved toward the second side in the axial direction, the claw 531 of the first locking piece 530 abuts on an outer peripheral surface of the outer wall part 210 and thereby the first locking piece 530 is elastically deformed radially outward. In this state, when the cover 500 is further moved until the claw 531 of the first locking piece 530 is moved to a position corresponding to the first engagement recess 240, the abutment of the claw 531 of the first locking piece 530 on the outer peripheral surface of the outer wall part 210 is released and thereby the first locking piece 530 elastically returns radially inward. Thus, the locking surface 531a of the claw 531 of the first locking piece 530 is engaged with the locking surface 240a of the first engagement recess 240. The inclined surface 531b of the claw 531 facilitates radially outward deformation of the first locking piece 530.

Furthermore, the claw 551 of the second locking piece 550 abuts on a wall surface of the insertion opening 250A of the second engagement recess 250 and thereby the second locking piece 550 is elastically deformed radially inward. In this state, when the cover 500 is further moved until the claw 551 of the second locking piece 550 passes through the insertion opening 250A, the abutment of the claw 551 of the second locking piece 550 on the wall surface of the insertion opening 250A is released and the second locking piece 550 elastically returns radially outward. Thus, the locking surface 551a of the claw 551 of the second locking piece 550 is engaged with the locking surface 250a of the second engagement recess 250. The inclined surface 551b on the claw 551 facilitates radially inward elastic deformation of the second locking piece 550.

In an embodiment in which the first mounting mechanism (the first locking piece 530, the first engagement recess 240) is used as the mounting mechanism for mounting the polymer cover 500 on the first assembly 200 and the cover 500 is formed (composed) of an electrically insulating polymer, as shown in FIGS. 9 to 12, openings 540 through the top wall 520 of the cover 500 in the axial direction are formed (provided, defined) at positions of the top wall 520, each of which corresponds to a respective one of the first locking pieces 530.

In so-called eco-friendly cars such as hybrid vehicles (HV), electric vehicles (EV) and fuel cell vehicles (FCV), a compressor (which may be referred to as an "electric compressor") having a compression mechanism part that is driven by a motor is used as the compressor for an air conditioner.

Recently, along with an increase in vehicle power supply voltage (400V or more, particularly 400 to 1500V), a motor designed for high voltage operation is also required to be used as the motor for an electric compressor of a vehicle.

In a motor designed for low voltage operation, an insulation distance between the stator winding(s) 400 arranged inside the first assembly 200 and an electrical component arranged outside of the outer wall part 210 of the first assembly 200 is adequate even if the openings 540 are formed in the top wall 520 of the cover 500. However, in a motor designed for high voltage operation, the insulation distance may be reduced due to the presence of the openings 540 of the cover 500.

In an embodiment in which the second mounting mechanism (the second locking piece 550, the second engagement recess 250) is used as the mounting mechanism(s) for mounting the cover 500 on the first assembly 200 and the cover 500 is formed (composed) of an electrically insulating polymer, unlike in the case of using the first mounting mechanism, an opening 540 is not formed at a position (portion) of the top wall 530 of the cover 500 corresponding to the second locking piece 550. In other words, the position (portion) of the top wall 530 corresponding to the second locking piece 550 is imperforate.

In the motor of this embodiment, either the first mounting mechanism or the second mounting mechanism is selectively used according to the mounting position at which the cover 500 is mounted to (on) the first assembly 200.

For example, at each of three of the four mounting positions in the circumferential direction, the first mounting mechanism (the first locking piece 530, the first engagement recess 240) is used to mount the cover 500 to (on) the first assembly 200, and at the other one mounting position, the second mounting mechanism (the second locking piece 550, the second engagement recess 250) is used to mount the cover 500 to (on) the first assembly 200.

In this case, at the position where the cover 500 is mounted on (to) the first assembly 200 by using the second mounting mechanism (the second locking piece 550, the second engagement recess 250), an opening through the top wall 520 is not formed at a position (portion) of the top wall 520 corresponding to the second locking piece 550.

By using the second mounting mechanism, a reduction of the electrical insulation distance, which would otherwise be caused by the presence of the opening formed in the top wall 520 of the cover 500, is avoided. For example, when an electrical component is arranged outside of the outer wall part 210 of the first assembly 200 in the vicinity of an arrangement position of the electrical component, the second mounting mechanism is used as the mounting mechanism for mounting the cover 500 to (on) the first assembly 200.

Furthermore, the second lead parts 400U2, 400V2 and 400W2 mounted on (fixed to) the outer wall part 210 of the first assembly 200 may come into contact with the winding parts and the first lead parts 400U1, 400V1 and 400W1.

In this embodiment, as shown in FIG. 12, first, second and third wall parts 521, 522, 523 are formed (provided, defined) on the second side (the stator core 100 side) of the top wall 520 of the cover 500 in the axial direction. The first wall part 521 is formed radially inward of the peripheral wall 510 and extends in the circumferential direction and the axial direction. The second and third wall parts 522, 523 are formed between ends of the first wall part 521 on the first and second sides in the circumferential direction and the peripheral wall 510, and extend radially. The first, second and third wall parts 521, 522 and 523 and the peripheral wall 510 define a recess (channel) 524 that extends in the circumferential direction and the axial direction and is open on the second side in the axial direction. The first, second and third wall parts 521, 522, 523 are configured such that the neutral point bus bar 410 and the projections 211C, 211D are located within the recess 524 when the cover 500 has been mounted on the first assembly 200.

This arrangement increases the electrical insulation distance between the neutral point bus bar 410 and the winding parts and the first lead parts 400U1, 400V1 and 400W1.

In the above description, the cover 500 of the first embodiment, which includes the first locking pieces 530 and the second locking piece 550 both formed on the peripheral wall 510 and the openings 540 formed in the top wall 520, is described, but covers having different configurations can also be used.

Figure 17:
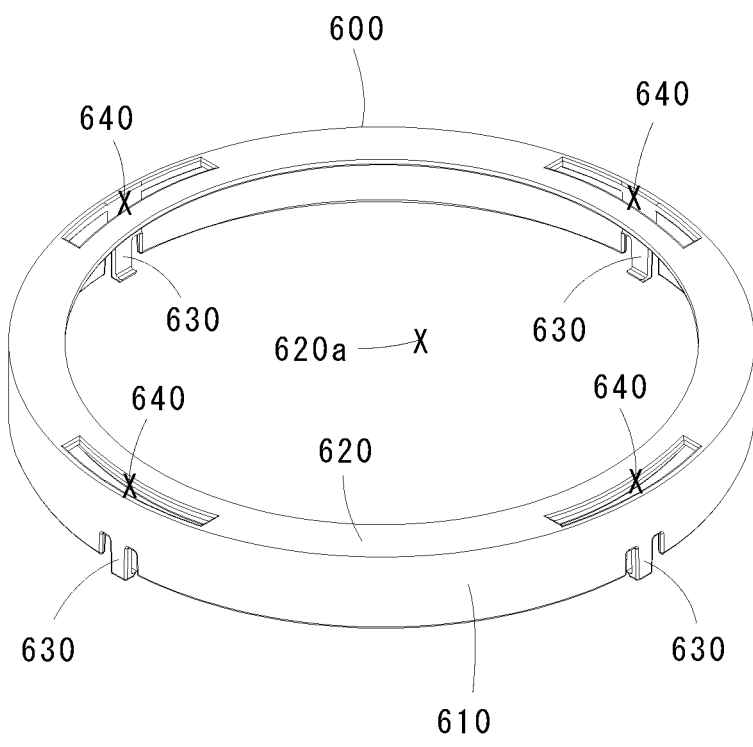
FIG. 17 is a perspective view of a cover of a second embodiment.

FIG. 17 shows a perspective view of a cover 600 of a second embodiment.

In the cover 600, only the first mounting mechanisms are used as the mounting mechanisms for mounting the cover 600 to the first assembly 200.

The cover 600 includes a peripheral (circumferential) wall 610 and a top wall 620.

First locking pieces 630 each constituting a portion of a respective one of the first mounting mechanisms are formed (provided, defined) at four positions in the circumferential direction on the peripheral wall 610, preferably equispaced.

First engagement recesses each constituting a portion of a respective one of the first mounting mechanisms are formed (provided, defined), at respective positions where the first locking pieces 630 are positioned, in the outer wall part 210 of the first assembly 200.

Furthermore, openings 640 are formed (provided, defined), at positions corresponding to each of the first locking pieces 630, in the top wall 620 such that the first locking piece 630 can be viewed through the opening 640. Because the openings 640 through which the first locking pieces 630 can be viewed are provided, the first locking pieces 630 can be easily placed at positions facing the corresponding first engagement recesses.

The cover 600 of the second embodiment is used when a reduction of the electrical insulation distance due to the presence of the openings 640 formed in the top wall 620 of the cover 600 would not cause a problem.

Figure 18:
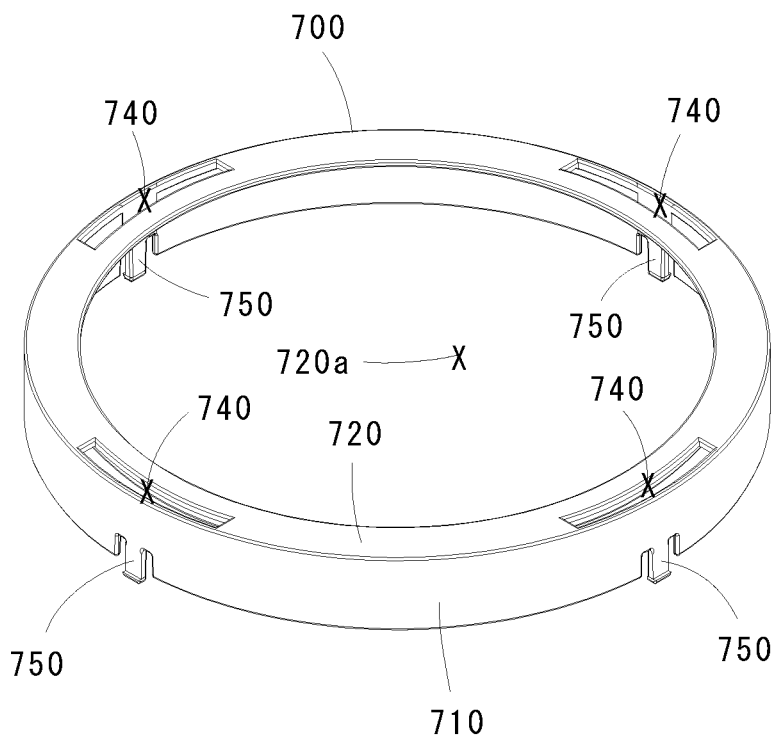
FIG. 18 is a perspective view of a cover of a third embodiment.

FIG. 18 shows a perspective view of a cover 700 of a third embodiment.

In the cover 700, only the second mounting mechanisms are used as the mounting mechanisms for mounting the cover 700 to the first assembly 200.

The cover 700 includes a peripheral (circumferential) wall 710 and a top wall 720.

Second locking pieces 750 each constituting a portion of a respective one of the second mounting mechanisms formed (provided, defined) at four positions in the circumferential direction on the peripheral wall 710, preferably equispaced.

Second engagement recesses each constituting a portion of a respective one of the second mounting mechanisms are formed (provided, defined), at respective positions where the second locking pieces 750 are positioned, in the outer wall part 210 of the first assembly 200.

Second engagement recesses each constituting a portion of a respective one of the second mounting mechanisms are formed (provided, defined) at respective positions where the second locking pieces 750 are positioned, in the outer wall part 210 of the first assembly 200.

Furthermore, openings 740 are formed (provided, defined), at positions corresponding to the second locking pieces 750, in the top wall 720.

The cover 700 of the third embodiment is used when the electrical insulation distance relative to the stator winding 400 arranged in the first assembly 200 needs to be increased.

In the cover 700 of the third embodiment, an opening through the top wall 720 in the axial direction, which is formed when the cover 700 is formed of resin, is not formed (provided, defined).

The cover 700 shown in FIG. 18 is provided with openings 740 through the top wall 720 in the axial direction in the top wall 720. The openings shown in FIG. 18 are provided in order to supply outside air to the stator winding arranged (disposed) inside the cover 600. That is, outside air is supplied through the openings 740 to the stator winding arranged inside the cover 700.

Figure 19:
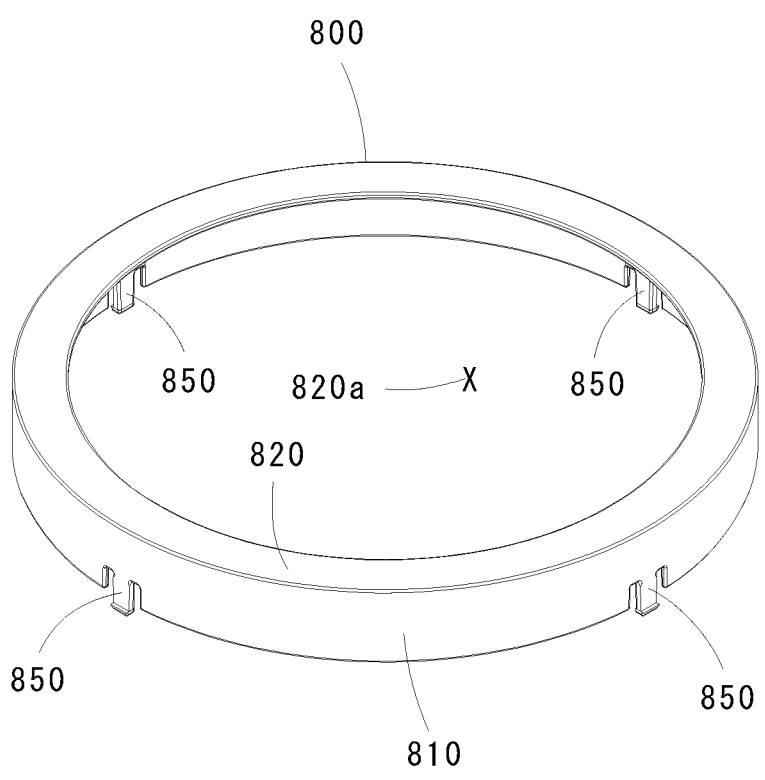
FIG. 19 is a perspective view of a cover of a fourth embodiment.

FIG. 19 shows a perspective view of a cover 800 of a fourth embodiment.

In the cover 800, only the second mounting mechanisms are used as the mounting mechanisms for mounting the cover 800 to the first assembly 200.

The cover 800 includes a peripheral (circumferential) wall 810 and a top wall 820.

In this embodiment, no openings through the top wall 810 in the axial direction are formed (provided, defined) even when the cover 800 is formed (composed) of a polymer.

The motor described above can be modified, e.g., as follows.

Although the first and second movement restriction parts are formed in (on) the first assembly 200, they may instead be formed in (on) the second assembly 300. In such a modification, the crossover parts 401a, 410b, 401c and the second lead parts 400U2, 400V2 and 400W2 of the respective phases are arranged (disposed) on the second assembly 300 side.

Two second movement restriction parts are provided in the embodiments described above, one of which restricts movement of the second lead parts 400U2, 400V2 and 400W2 toward the first side in the circumferential direction and the other restricts the movement toward the second side in the circumferential direction. However, only one second movement restriction part may be provided to restrict the movement toward one of the first and second sides in the circumferential direction.

In the above-described embodiments, the projection having an abutment part on which the neutral point bus bar 410 abuts is used as the second movement restriction part. However, the second movement restriction part is not limited to this design of the projection. In other words, the second movement restriction part may be configured to only restrict movement of the neutral point bus bar toward at least one of the first and second sides in the circumferential direction.

In addition, the second movement restriction part may be omitted.

Although the first movement restriction part is formed by the two grooves (211a, 211b) in the embodiments above, it may be formed by at least one groove.

Even though grooves (211a, 211b) are used as a part of the first movement restriction part, the first movement restriction part is not limited to embodiments having such grooves. In other words, the first movement restriction part may be configured to only restrict the neutral point bus bar from moving radially inward and outward and toward the stator core side in the axial direction.

The grooves (211a, 211b) that are open on the first and second sides in the circumferential direction are used as the first movement restriction part in the above embodiments. However, a groove that is open on one of the first and second sides in the circumferential direction or a groove that is closed on at least one of the first and second sides in the circumferential direction may instead be used as the first movement restriction part.

In the embodiments above, the neutral point part to which the second lead parts 400U2, 400V2 and 400W2 are connected in common is formed by the neutral point bus bar 410, but the structure of the neutral point part is not limited to this. For example, the neutral point part may be formed by one of the second lead parts to which the other two second lead parts are connected.

The structure of the cover is not limited to the structure described in the embodiments above. Furthermore, although the cover is mounted on the first assembly 200, it may instead be mounted on the second assembly 300. In such an embodiment, the crossover parts 401a, 401b, 401c of the stator windings of respective phases are arranged (disposed) on the second assembly 300 side.

Further, the cover may be omitted.

The present disclosure can be provided with the following features.

(Aspect 1) A motor, comprising a rotor and a stator, wherein the stator includes a tubular stator core extending in an axial direction, first and second electrical insulator assemblies that are respectively arranged on a first and second sides of the stator core in the axial direction, and a stator winding;

the stator core includes a yoke extending in a circumferential direction around an axis of the stator core and teeth each extending radially inward from the yoke;

each of the first and second electrical insulator assemblies includes an outer wall part that extends in the circumferential direction and the axial direction, inner wall parts that are arranged radially inward of the outer wall part and that extend in the circumferential direction and the axial direction, and body parts that are arranged on the stator core side in the axial direction between the outer wall part and the inner wall parts and extend radially;

the stator winding includes first, second and third phase stator windings, each of the stator windings including a winding part (coil) wound around a respective tooth of the stator core, a first lead part connected to a power supply, and a second lead part connected in common;

wherein:

the stator winding includes a neutral point part to which the second lead parts of the phase stator windings are connected in common; and the outer wall part of the first electrical insulator assembly includes at least one first movement restriction part that restricts movement of the neutral point part.

(Aspect 2) The motor as defined in Aspect 1, wherein the at least one first movement restriction part is configured to restrict the neutral point part from moving radially inward and radially outward and toward the second side in the axial direction.

(Aspect 3) The motor as defined in Aspect 1 or 2, wherein:

the outer wall part of the first electrical insulator assembly includes at least one first projection protruding toward the first side in the axial direction;

the at least one first projection has a groove that extends in the circumferential direction and is open on the first side in the axial direction and is configured such that the neutral point part can be inserted therein; and the at least one first movement restriction part includes the groove.

(Aspect 4) The motor as defined in any one of Aspects 1 to 3, wherein the at least one first movement restriction part is configured to restrict movement of the neutral point part toward at least one of the first and second sides in the circumferential direction.

(Aspect 5) The motor as defined in any one of Aspects 1 to 4, wherein the groove is closed on at least one of the first and second sides in the circumferential direction.

(Aspect 6) The motor as defined in any one of Aspects 1 to 4, wherein the groove is open on one of the first and second sides in the circumferential direction.

(Aspect 7) The motor as defined in any one of Aspects 1 to 3, wherein:

the outer wall part of the first electrical insulator assembly includes at least one second movement restriction part on at least one of first and second sides of the at least one first movement restriction part in the circumferential direction; and the at least one second movement restriction part is configured to restrict movement of the neutral point part toward the at least one of the first and second sides in the circumferential direction.

(Aspect 8) The motor as defined in any one of Aspects 1 to 3, wherein the groove is open on first and second sides in the circumferential direction.

(Aspect 9) The motor as defined in any one of Aspects 1 to 3 and 8, wherein:

the outer wall part of the first electrical insulator assembly includes second movement restriction parts on each of first and second sides of the at least one first projection in the circumferential direction; and the second movement restriction part arranged on the first side in the circumferential direction is configured to restrict movement of the neutral point part toward the first side in the circumferential direction, and the second movement restriction part arranged on the second side in the circumferential direction is configured to restrict movement of the neutral point part toward the second side in the circumferential direction.

(Aspect 10) The motor as defined in Aspect 7 or 9, wherein the second movement restriction part includes at least one second projection protruding toward the first side in the axial direction.

(Aspect 11) The motor as defined in any one of Aspects 8 to 10, wherein the neutral point part includes a neutral point bus bar to which the second lead parts of the phase stator windings are connected.

(Aspect 12) The motor as defined in any one of Aspects 1 to 11, wherein:

the stator includes a cover that is arranged on the first side of the first electrical insulator assembly in the axial direction;

the cover includes a peripheral wall that is arranged outside of the outer wall part of the first electrical insulator assembly and a top wall that is arranged on the first side of the outer wall of the first electrical insulator assembly in the axial direction;

the peripheral wall extends in the circumferential direction and the axial direction; and the top wall is connected to an end of the peripheral wall on the first side in the axial direction and extends in a direction crossing the axial direction, and has an open part in a center.

(Aspect 13) The motor as defined in Aspect 12, wherein mounting mechanisms are provided for mounting the cover to (on) the outer wall part of the first electrical insulator assembly and are respectively formed at positions spaced apart from each other in the circumferential direction.

(Aspect 14) The motor as defined in Aspect 13, wherein:

Each of the mounting mechanisms includes a locking piece formed in (on) the peripheral wall of the cover and an engagement recess formed in the outer wall part of the first electrical insulator assembly;

the locking piece extends in the axial direction and is configured such that an end part on the second side in the axial direction can be elastically radially deformed relative to an end part on the first side in the axial direction, and the locking piece has a claw formed on the end part on the second side in the axial direction; and the engagement recess is configured to be engageable (engaged) with (by) the claw of the locking piece.

(Aspect 15) The motor as defined in Aspect 14, wherein:

the claw formed on each of the locking pieces protrudes radially outward;

the outer wall part of the first electrical insulator assembly includes a second projection that protrudes radially outward at a position where the locking piece is positioned on an end part of the outer wall part on the second side in the axial direction; and the engagement recess is formed in the second projection.

(Aspect 16) The motor as defined in Aspect 14, wherein: the claw formed on each of the locking pieces protrudes radially inward; and the engagement recess is formed at a position where the locking piece is positioned on an end part of the outer wall part of the first electrical insulator assembly on the second side in the axial direction.

(Aspect 17) The motor as defined in Aspect 14, wherein: the claw formed on at least one of the locking pieces protrudes radially outward, the claws formed on the locking pieces other than the at least one of the locking piece protrude radially inward, the outer wall part of the first electrical insulator assembly includes a second projection that protrudes radially outward at a position where the at least one of the locking piece is positioned on an end part of the outer wall part on the second side in the axial direction, the engagement recess that is configured to be engageable (engaged) with (by) the claw of the at least one of the locking piece is formed in the second projection; and at positions of the outer wall part of the first electrical insulator assembly where the other locking pieces rather than the at least one of the locking pieces are positioned, each of the engagement recesses is configured to be engageable (engaged) with (by) the other locking pieces rather than the at least one of the locking pieces are formed.

(Aspect 18) A compressor, having a compression mechanism part for compressing a working medium and a motor for driving the compression mechanism part, wherein:

the motor comprises the motor as defined in any one of Aspect 1 to 17.

The present disclosure is not limited to the structures described in the embodiment, but rather, may be added to, changed, replaced with alternatives or otherwise modified.

Embodiments of the present disclosure may be configured as a motor or a compressor.

Any of the features or structures described in the embodiment may be used individually or in combination of appropriately selected ones.

DESCRIPTION OF THE REFERENCE NUMERALS

10: compressor, 20: housing, 21: housing inner peripheral surface, 22: suction pipe, 23: discharge pipe, 30: motor, 40: stator, 50: rotor, 60: rotor core, 61: rotor core inner peripheral surface, 62: rotor core outer peripheral surface, 70: rotating shaft, 80: compression mechanism part, 81: cylinder, 82: eccentric rotor, 83: compression chamber, 83$a$: outlet port, 84, 85: bearing, 100: stator core, 100A, 100B: stator core end surface, 102: stator core outer peripheral surface, 103: notched surface, 104: passage, 110: yoke, 120: tooth, 121: tooth base part, 122: tooth tip part, 122$a$: tooth tip surface, 130: slot, 140: positioning recess, 200, 300: electrical insulator assembly, 200A, 300A: end surface, 201, 301: recess, 210, 310: outer wall part, 211: projection, 211A, 211B: projection (first movement restriction part), 211C, 211D: projection (second movement restriction part), 211$a$, 211$b$: groove, 212: notch, 213A to 213C: guide groove, 220, 320: inner wall part, 230: body part, 240: first engagement recess, 240$a$: locking surface, 250: second engagement recess, 250A: insertion opening, 250$a$: locking surface, 260: projection, 260 $a$: locking surface, 261: positioning projection, 400: stator winding, 401$a$ to 401$c$: crossover part, 400U1, 400V1, 400W1: first lead part, 400U2, 400V2, 400W2: second lead part, 410: neutral point bus bar, 500, 600, 700, 800: cover, 510, 610, 710, 810: peripheral wall, 520, 620, 720, 820: top wall, 521 to 523: wall part, 524: recess, 520$a$, 620$a$, 720$a$, 820$a$: opening, 530, 630: first locking piece, 531: claw, 531$a$: locking surface, 531$b$: inclined surface, 540, 640, 740: opening, 550, 750, 850: second locking piece, 551: claw, 551$a$: locking surface, 551$b$: inclined surface

The invention claimed is:

1. A motor, comprising a rotor and a stator, wherein:

the stator includes a tubular stator core extending in an axial direction, first and second electrical insulator assemblies that are arranged respectively on a first side and a second side of the stator core in the axial direction, and a stator winding;

the stator core includes a yoke extending in a circumferential direction around an axis of the stator core, and a plurality of teeth each extending radially inward from the yoke;

each of the first and second electrical insulator assemblies includes an outer wall part that extends in the circumferential direction and the axial direction, inner wall parts each of which is arranged radially inward of the outer wall part and extends in the circumferential direction and the axial direction, and body parts each of which is arranged on the stator core side in the axial direction between the outer wall part and each of the inner wall parts and extends radially;

the stator winding includes first, second and third phase stator windings each including at least one winding part, a first lead part and a second lead part, the winding parts being respectively wound around the teeth of the stator core, each of the first lead parts being connected to a power supply, and each of the second lead parts being connected in common to a neutral point part;

the outer wall part of the first electrical insulator assembly includes at least one movement restriction part configured to restrict movement of the neutral point part;

the at least one movement restriction part comprises at least one first movement restriction part configured to restrict the neutral point part from moving radially inward and radially outward and toward the second side in the axial direction;

the outer wall part of the first electrical insulator assembly includes at least one first projection protruding toward the first side in the axial direction;

the at least one first projection has a groove that extends in the circumferential direction and is open on the first side in the axial direction and is configured such that the neutral point part is insertable therein;

the at least one first movement restriction part comprises the groove; and the groove is closed on the first side in the circumferential direction and/or on the second side in the circumferential direction.

2. The motor as defined in claim 1, wherein the first movement restriction part is configured to restrict movement of the neutral point part toward the first side in the circumferential direction and/or toward the second side in the circumferential direction.

3. The motor as defined in claim 1, wherein the groove is open on the first side or on the second side in the circumferential direction.

4. The motor as defined in claim 1, wherein the at least one movement restriction part further comprises at least one second movement restriction part configured to restrict circumferential movement of the neutral point part in at least one direction.

5. The motor as defined in claim 4, wherein:

the outer wall part of the first electrical insulator assembly further includes at least one second projection protruding toward the first side in the axial direction;

the at least one second projection is circumferentially spaced apart from the at least one first projection; and the at least one second movement restriction part comprises the at least one second projection.

6. The motor as defined in claim 5, wherein the groove is open on the first side or on the second side in the circumferential direction.

7. The motor as defined in claim 6, wherein:

the first movement restriction part is disposed on a first side of the at least one first projection in the circumferential direction and the second movement restriction part is disposed on a second side of the at least one first projection in the circumferential direction; and the first movement restriction part is configured to restrict movement of the neutral point part toward the first side in the circumferential direction, and the second movement restriction part is configured to restrict movement of the neutral point part toward the second side in the circumferential direction.

8. The motor as defined in claim 7, wherein the first and second movement restriction parts are protrusions.

9. The motor as defined in claim 8, wherein the neutral point part comprises a neutral point bus bar.

10. The motor as defined in claim 8, further comprising a cover that is arranged on the first side of the first electrical insulator assembly in the axial direction.

11. The motor as defined in claim 4, wherein the first and second movement restriction parts are protrusions.

12. The motor as defined in claim 1, wherein the neutral point part comprises a neutral point bus bar.

13. The motor as defined in claim 1, further comprising a cover that is arranged on the first side of the first electrical insulator assembly in the axial direction.

14. A motor, comprising a rotor and a stator, wherein:

the stator includes a tubular stator core extending in an axial direction, first and second electrical insulator assemblies that are arranged respectively on a first side and a second side of the stator core in the axial direction, and a stator winding;

the stator core includes a yoke extending in a circumferential direction around an axis of the stator core, and a plurality of teeth each extending radially inward from the yoke;

each of the first and second electrical insulator assemblies includes an outer wall part that extends in the circumferential direction and the axial direction, inner wall parts each of which is arranged radially inward of the outer wall part and extends in the circumferential direction and the axial direction, and body parts each of which is arranged on the stator core side in the axial direction between the outer wall part and each of the inner wall parts and extends radially;

the stator winding includes first, second and third phase stator windings each including at least one winding part, a first lead part and a second lead part, the winding parts being respectively wound around the teeth of the stator core, each of the first lead parts being connected to a power supply, and each of the second lead parts being connected in common to a neutral point part;

the outer wall part of the first electrical insulator assembly includes at least one first movement restriction part and at least one second movement restriction part;

the at least one first movement restriction part is configured to restrict the neutral point part from moving radially inward and radially outward and toward the second side in the axial direction; and the at least one second movement restriction part is configured to restrict circumferential movement of the neutral point part in at least one direction.

15. The motor as defined in claim 14, wherein:

the outer wall part of the first electrical insulator assembly includes at least one first projection protruding toward the first side in the axial direction;

the at least one first projection has a groove that extends in the circumferential direction and is open on the first side in the axial direction and is configured such that the neutral point part is insertable therein; and the at least one first movement restriction part comprises the groove.

16. The motor as defined in claim 15, wherein the first movement restriction part is configured to restrict movement of the neutral point part toward a first side in the circumferential direction and/or toward a second side in the circumferential direction.

17. The motor as defined in claim 16, wherein the groove is closed on the first side in the circumferential direction and/or on the second side in the circumferential direction.

18. The motor as defined in claim 16, wherein the groove is open on the first side and/or on the second side in the circumferential direction.

19. The motor as defined in claim 14, wherein the first movement restriction part is configured to restrict movement of the neutral point part toward a first side in the circumferential direction, and the second movement restriction part is configured to restrict movement of the neutral point part toward a second side in the circumferential direction.

20. The motor as defined in claim 14, wherein the first and second movement restriction parts are protrusions.

* * * * *